(12) United States Patent  
Kramarenko et al.

(10) Patent No.: US 9,191,447 B2  
(45) Date of Patent: *Nov. 17, 2015

(54) SYSTEM AND METHOD FOR APPLYING AUTHENTICATION AND SECURITY POLICIES IN A SIP ENVIRONMENT

(71) Applicant: BlackBerry Limited, Waterloo (CA)

(72) Inventors: Valentina Iqorevna Kramarenko, Milton (CA); Boris Rozinov, Richmond Hill (CA); Mee Tchin Jane John Chuan, Richmond Hill (CA); Swee Tuan Pang, Oakville (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/454,004

(22) Filed: Aug. 7, 2014

(65) Prior Publication Data

US 2014/0351449 A1 Nov. 27, 2014

Related U.S. Application Data

(63) Continuation of application No. 13/440,070, filed on Apr. 5, 2012, now Pat. No. 8,839,364.

(60) Provisional application No. 61/471,941, filed on Apr. 5, 2011, provisional application No. 61/471,952, filed on Apr. 5, 2011, provisional application No. 61/472,007, filed on Apr. 5, 2011, provisional application No. 61/472,525, filed on Apr. 6, 2011.

(51) Int. Cl.
  *H04L 29/06* (2006.01)
  *H04L 29/08* (2006.01)
  *H04L 29/12* (2006.01)

(52) U.S. Cl.
  CPC .......... *H04L 67/147* (2013.01); *H04L 61/1535* (2013.01); *H04L 61/303* (2013.01);

(Continued)

(58) Field of Classification Search
  CPC .... H04L 67/147; H04L 63/082; H04L 63/108
  USPC ........................................................... 726/3
  See application file for complete search history.

(56) References Cited

U.S. PATENT DOCUMENTS 6,625,141 B1 * 9/2003 Glitho et al. ................. 370/352
7,505,432 B2    3/2009 Leung et al.

(Continued)

FOREIGN PATENT DOCUMENTS

WO    WO03/081431    10/2003

OTHER PUBLICATIONS

Emin Gabrielyan, "The Path of SIP signaling messages", Switzernet, Apr. 12, 2007; from: http://switzernet.com/people/emingabrielyan/070412-SIP-record-route/.
Office Action; U.S. Appl. No. 13/440,109; Nov. 7, 2014.
Extended European Search Report; European Application No. 12163475.2; Sep. 12, 2013.

(Continued)

*Primary Examiner* — Michael S McNally
(74) *Attorney, Agent, or Firm* — Ridout & Maybee LLP

(57) ABSTRACT

The present disclosure provides a system and method for applying authentication and security policies in a SIP environment. In accordance with one embodiment, there is provided a method for use on a SIP server, comprising: establishing a persistent connection with a user agent (UA); initiating an idle connection timeout countdown timer; performing authentication of an initial REGISTER request using a first level of authentication; and terminating the persistent connection when the initial REGISTER request is not validated before expiry of the idle connection timeout countdown timer.

17 Claims, 13 Drawing Sheets

(52) U.S. Cl.
CPC .......... *H04L61/3085* (2013.01); *H04L 63/083* (2013.01); *H04L 65/1006* (2013.01); *H04L 65/1073* (2013.01); *H04L 67/143* (2013.01); H04L 61/2575 (2013.01); H04L 63/08 (2013.01); H04L 63/108 (2013.01); H04L 63/1458 (2013.01); H04L 63/20 (2013.01)

(56) References Cited

U.S. PATENT DOCUMENTS

| | | | |
|---|---|---|---|
| 7,805,517 | B2 | 9/2010 | Shim et al. |
| 7,817,618 | B2 | 10/2010 | Hurtia |
| 7,961,685 | B2 | 6/2011 | Suh et al. |
| 8,098,662 | B2 | 1/2012 | Prakash et al. |
| 2003/0212912 | A1 | 11/2003 | Bajko et al. |
| 2003/0229787 | A1* | 12/2003 | Gabor .......................... 713/168 |
| 2004/0024879 | A1 | 2/2004 | Dingman et al. |
| 2004/0148364 | A1 | 7/2004 | Kim |
| 2006/0026290 | A1 | 2/2006 | Pulito et al. |
| 2006/0039359 | A1* | 2/2006 | Pang ............................. 370/352 |
| 2006/0069776 | A1 | 3/2006 | Shim et al. |
| 2007/0242628 | A1 | 10/2007 | Dutta |
| 2008/0153489 | A1 | 6/2008 | Lee |
| 2009/0037564 | A1 | 2/2009 | Jayadevan et al. |
| 2009/0141688 | A1 | 6/2009 | Leung et al. |
| 2009/0201913 | A1 | 8/2009 | Levy |
| 2010/0030863 | A1 | 2/2010 | Qin |
| 2010/0091703 | A1 | 4/2010 | Morimoto |
| 2010/0226313 | A1 | 9/2010 | Sugimoto |
| 2010/0278112 | A1 | 11/2010 | Morimoto |
| 2011/0028130 | A1 | 2/2011 | Swaminathan et al. |

OTHER PUBLICATIONS

Chen E Y et al: "A whitelist approach to protest SIP servers from flooding attacks", Communications Quality and Reliability(CQR), 2010 IEEE International Workshop Technical Committee On, IEEE, Piscataway, NJ, USA, Jun. 8, 2010, pp. 1-6, XP031788571.
Office Action; U.S. Appl. No. 13/440,109; Oct. 22, 2013.
Office Action; Canadian Application No. 2,773,333; Sep. 13, 2013.
Rosenberg et al., SIP: Session Initiation Protocol, Jun. 2002, RFC3261, pp. 1-270.
Office Action; U.S. Appl. No. 13/440,021; Sep. 13, 2013;.
Nilanjan Banerjee et al: "Enabling SIP-based sessions in ad hoc networks", Wireless Networks ; The Journal of Mobile Communication, Computation and Information, Kluwer Academic Do, vol. 13, No. 4, Jun. 15, 2006, pp. 461-479, XP019509769, ISSN: 1572-8196 * p. 471-p. 472 *.
Extended European Search Report; EP Application No. 12163478.6; Aug. 8, 2012.
Extended European Search Report; EP Application No. 12163458.8; Aug. 8, 2012.
Office Action; U.S. Appl. No. 13/440,089; Oct. 11, 2012.
Other Configuration Tasks, Cisco Mobile Wireless Home Agent Release 5.0 for Cisco IOS Release 12.4(22)YD, http://www.cisco.com/en/US/docshos/12_4/12_4x/12_4_22yd/Home_Agent_5_0/feature_guide/ha_othera_3.pdf, at least as early as Apr. 8, 2009.
High-Availability Solutions for SIP Enabled Voice-over-IP Networks, http://www.cisco_com/warp/public/cc/techno/ at least as early as Oct. 25, 2004.
Overview of SIP Voice Routing, Cisco IOS SIP Voice Routing Application Guide, http://www.cisco.connien/US/docs/ios/12_3/vvfc/cisco_ios_sip_voice_routing_application_guide/SIPOV.pdf, at least as early as Oct. 25, 2004.
C. Jennings, R. Mahy, and F Audet, Request for Comments: 5626 (Managing Client-Initiated Connections in the Initiation Protocol (SIP)), Network Working Group, Oct. 2009.
Office Action; Canadian Application No. 2,773,333; Aug. 21, 2014.
j_Rosenberg, R. Mahy, P. Matthews, D. Wing, Request for Comments: 5389 (Session Traversal Utilities for NAT Network Working Group, Oct. 2008.
Server object,CherryPy: A Minimalist Python Web Framework, http://www.cherrypy.org/wiki/ServerObject, at least as Jun. 23, 2011.
Specifying network time-outs on the Web server, IBM Lotus Domino Administrator 8.0, http://lpublib.boulder.ibm.com/infocenter/domhelp/v8r0/index.jsp?topic=/com.ibm.help.domino.admin.doc/DOC/H_SPECIFYING_TIMEOUTS_SETTINGS_IN_THE_HTTP_SERVER_DOCUMENT.html, Aug. 14, 2008.
IBM eNetwork Firewall for Windows NT, Users Guide, Version 3 Release 2, ftp://public.dheibm.com/software/security/firewall/pdf/fwuser_nt32.pdf, Mar. 1998.
Apache HTTP Server Version 22, Apache Core Features, http://httpd.apache.org/docs/2.2/mod/core.html, at least as as early as Jul. 25, 2011.
PL/SQL Packages and Types Reference, 10g Release 1 (10.1), Part No. B10802-01, http://www.stanford.edu/dept/itss/docs/oracle/10g/appdev.101/b10802/u_http.htm, at least as early as Apr. 12, 2009.
Fielding, et al. PCT part of RFC 2616 (Hypertext Transfer Protocol—HTTPp/1.1), Section 8 (Connections), http://www.w3.org/Protocols/rfc2616/rfc2616-sec8.html, Jun. 1999.
Balachander Krishnamurthy, Jeffrey C. Mogul and David M. Kristol, Key Differences between HTTP/1.0 and HTTP/1.1, http://www8.org/w8-papers/5c-protocols/key/key.html, at least as early as Sep. 25, 2010.
InterScanTM Web Security Virtual Appliance 3: Antivirus and Content Security at the Web Gateway, Installation Guide, Jul. 2008.
Jonathan Rosenberg, Making SIP NAT Friendly, www.softarmorcom/sipwg/meets/iet150/slides/natfriendly_mar01.ppt, at least as early as Nov. 17, 2006.
Vlad Olaru and Walter F. Tichy, On the Design and Performance of Kernel-level TCP Connection Endpoint Migration in Cluster-Based Servers, Proceedings of the 5th IEEE International Symposium on Cluster Computing and the Grid (CCGRID), http://www.ipd.uka.deiTichy/uploads/publikationen/128/paper80.pdf, 2005.
Yongguang Zhang and Son Dao, A "Persistent Connection" Model for Mobile and Distributed Systems, 1995, pp. 300-307.
SQL to Mongo Mapping Chart, PHP Manual, http://php.net/manual/en/mongo.connecting.php, at least as early as Dec. 10, 2010.
Microsoft, Session Initiation Protocol (SIP) Routing Extensions, Chapter 3: Protocol Details, 3.6.3 Initialization, http://msdn.microsoft.com/en-us/library/dd947882(v=office.12).aspx, at least as early as Jan. 20, 2012.
T. Froment, C. C Lebel and B. Bonnaerens, Request for Comments: 5658 (Addressing Record-Route Issues in the . Session Initiation Protocol (SIP)), Network Working Group, Oct. 2009.
Jan Janake, SIP Introduction, http://sip-router.org/docbook/sip-router/branch/master/sip/sip_introduction.html, 2003.
Jan Janak and Bogdan-Andrei Iancu, Record Routing (RR) Module, http://kamailio.org/docs/modules/1.5.x/rr.html, at least as early as Aug. 6, 2008.
Information home: IBM WebSphere Application Server, Network Deployment (Distributed operating systems), Version 6.1, SIP Session affinity and failover, http://publib.boulderibm.com/infocenter/wasinfo/v6r1/index.jsp?topic4com.ibm.websphere.nd.doc/info/ae/ae/csip_sessionfail.html, at least as early as Feb. 9, 2012.
J. Rosenberg, Request for Comments: 3680(A Session Initiation Protocol (SIP) Event Package for Registrations), Network Working Group, Mar. 2004.
M. Handley, V. Jacobson and C. Perkins, Request for Comments: 4566 (SDP: Session Description Protocol), Network Working Group, Jul. 2006.
H. Schulzrinne, S. Casner, R. Frederick and V. Jacobson, Request for Comments: 3550 (RTP: A Transport Protocol for Real-Time Applications), Network Working Group, Jul. 2003.
V. Gurbani, R. Mahy and B. Tate, Request for Comments: 5923 (Connection Reuse in the Session Initiation Protocol (SIP)), Network Working Group, Jun. 2010.
Office Action; Canadian Application No. 2,773,352; Aug. 12, 2014.
Office Action; Canadian Application No. 2,773,337; Jul. 8, 2014.
Final Office Action; U.S. Appl. No. 13/440,021; Mar. 21, 2014.

(56) References Cited

OTHER PUBLICATIONS

Communication pursuant to Article 94(3); EP Application No. 12163458.8; May 7, 2014.
Office Action; Canadian Application No. 2,773,503; Aug. 14, 2014.
Office Action; U.S. Appl. No. 13/440,109; May 22, 2014.
Rosenberg, J. et al.; SIP: Session Initiation Protocol; 20020601: 20020600; Jun. 1, 2002, pp. 1-269.
Extended European Search Report; EP 12163462.0; Jun. 18, 2015.

* cited by examiner

SYSTEM AND METHOD FOR APPLYING AUTHENTICATION AND SECURITY POLICIES IN A SIP ENVIRONMENT

RELATED APPLICATION DATA

The present application is a continuation of U.S. application Ser. No. 13/440,070, filed on Apr. 5, 2012, which claims priority to and the benefit of provisional U.S. patent application Ser. No. 61/471,941, filed Apr. 5, 2011, provisional U.S. patent application Ser. No. 61/471,952, filed Apr. 5, 2011, provisional U.S. patent application Ser. No. 61/472,007, filed Apr. 5, 2011, provisional U.S. patent application Ser. No. 61/472,525, filed Apr. 6, 2011, the content of all of these documents being incorporated herein by reference.

TECHNICAL FIELD

The present disclosure relates to the Session Initiation Protocol (SIP), and more particularly to a system and method for SIP communications in a clustered environment.

BACKGROUND

Session Initiation Protocol (SIP) is a signaling protocol used for controlling multimedia communication sessions such as voice and video calls over Internet Protocol to both mobile and fixed user agents (UAs). SIP is an application-layer control protocol which runs on top of several different transport protocols, such as the Transmission Control Protocol (TCP), the Internet Protocol (IP) and the User Datagram Protocol (UDP). SIP has been standardized and governed primarily by the Internet Engineering Task Force (IETF) as a protocol for setting up and managing IP Multimedia Subsystem (IMS)-based calls, and is defined by Request for Comments (RFC) 3261. SIP can be used for creating, modifying and terminating two-party (unicast) or multiparty (multicast) sessions consisting of one or several media streams. Modifications can involve changing addresses or ports, inviting more participants, and adding or deleting media streams. Other application examples include video conferencing, streaming multimedia distribution, instant messaging, presence information, file transfer and online games.

SIP invitations are used to create multimedia sessions and carry session descriptions that allow UAs to agree on a set of compatible media types. SIP uses proxy servers to help route requests to a UA's current (logical) location, authenticate and authorize UAs for services, implement provider call-routing policies, and provide features to UAs. Proxy servers, however, are merely intermediaries and are separate from the actual multimedia sessions—audio, video, and session-mode messaging—that SIP establishes. Details of the sessions are carried in the payload of SIP messages and are usually described with the Session Description Protocol (SDP) defined in RFC 4566. SIP provides a registration function that allows UAs to upload their current locations for use by proxy servers. SIP runs on top of several different transport protocols.

DETAILED DESCRIPTION

Figure 1A:
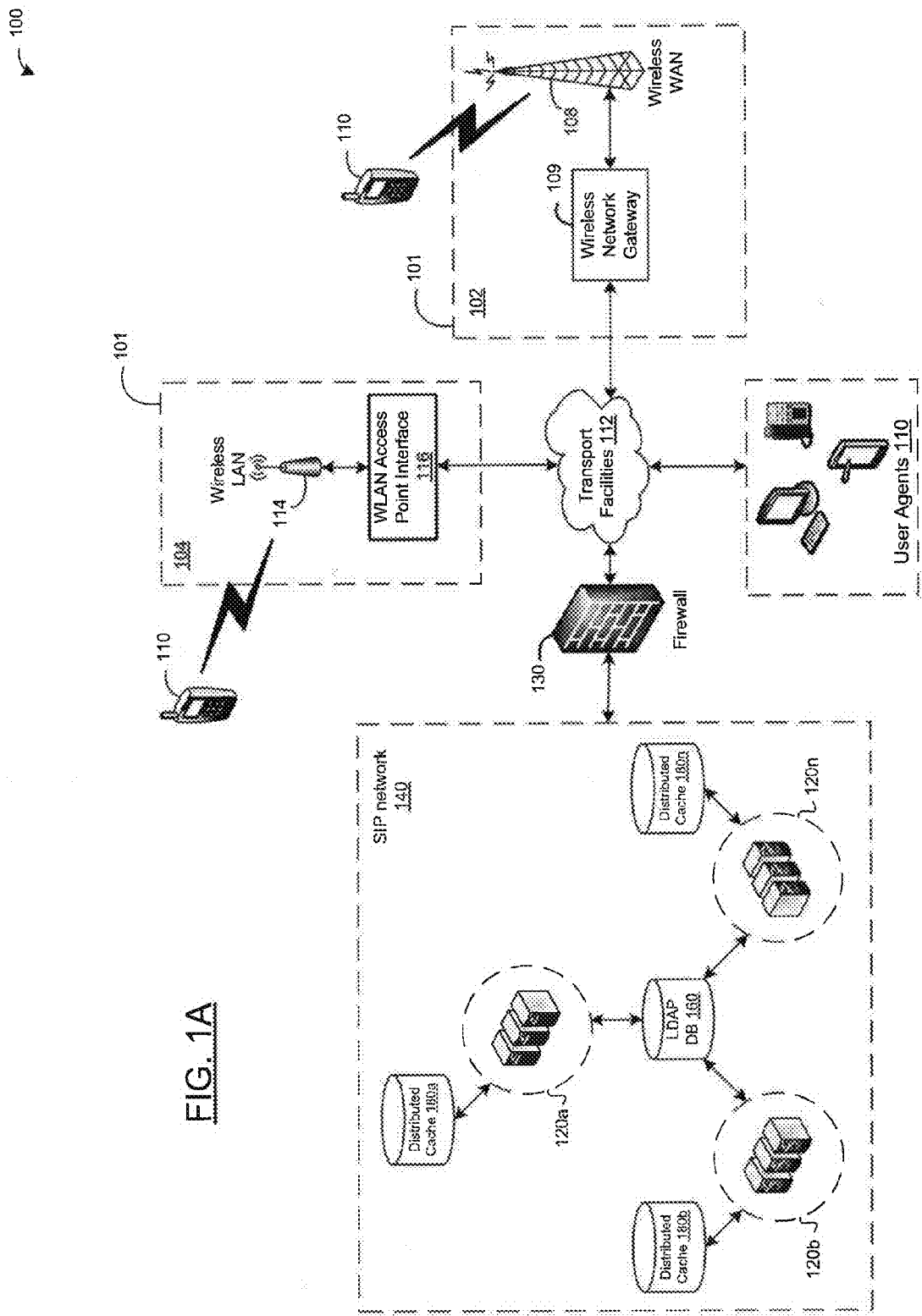
FIG. 1A is a block diagram of a communication system in accordance with an example embodiment of the present disclosure.

Reference will now be made to the accompanying drawings which show, by way of example, example embodiments of the present disclosure. For simplicity and clarity of illustration, reference numerals may be repeated among the Figures to indicate corresponding or analogous elements. Numerous details are set forth to provide an understanding of the example embodiments described herein. The example embodiments may be practiced without these details. In other instances, well-known methods, procedures, and components have not been described in detail to avoid obscuring the example embodiments described. The description is not to be considered as limited to the scope of the example embodiments described herein.

A UA is a logical entity that can act as both a user agent client and user agent server. A user agent client (UAC) is a logical entity that creates a new SIP request and uses the client's hardware to send it. The role of UAC lasts only for the duration of the transaction. The client may be any network element capable of sending SIP requests and receiving SIP responses. Clients may or may not interact directly with a user. A user agent server (UAS) is a logical entity that generates a response to a SIP request and uses the server's hardware to send it. The response accepts, rejects, or redirects the request. This role lasts only for the duration of that transaction. UA can also refer to any hardware or software component that can terminate a SIP session.

A UA may be a mobile device, such as mobile telephone, handheld, tablet or laptop computer or possibly a network node (e.g., server) having telecommunications capabilities. A UA may comprise a mobile device and its associated Universal Integrated Circuit Card (UICC) that includes a Subscriber Identity Module (SIM) application, a Universal Subscriber Identity Module (USIM) application, or a Removable User Identity Module (R-UIM) application, or may include the mobile device itself without such a card. A UA may also be a device having similar capabilities but which is not transportable, such as a fixed line telephone, desktop computer, set-top box or network node. When a UA is a network node, the network node could act on behalf of another function such as a mobile device or a fixed line device and simulate or emulate the mobile device or fixed line device. For example, for some mobile devices, the UA client that would typically reside on the device actually resides in the network and relays SIP message information to the device using optimized protocols. Accordingly, some functions that were traditionally carried out by a mobile device can be distributed in the form of a remote UA, where the remote UA represents the mobile device in the network.

Network Configuration

Reference is first made to FIG. 1A which shows in block diagram form a communication system 100 in accordance with an example embodiment of the present disclosure. The communication system 100 comprises a number of UAs 110, such as a wireless or mobile communication device, which can connect to the system 100 in any of several different ways. UAs 110 can connect to a wireless communication network 101. The communication system 100 includes a SIP network 140 with which the UAs 110 may communicate. A portion of the components that may be present in the SIP network 140 are shown in FIG. 1A.

Figure 1B:
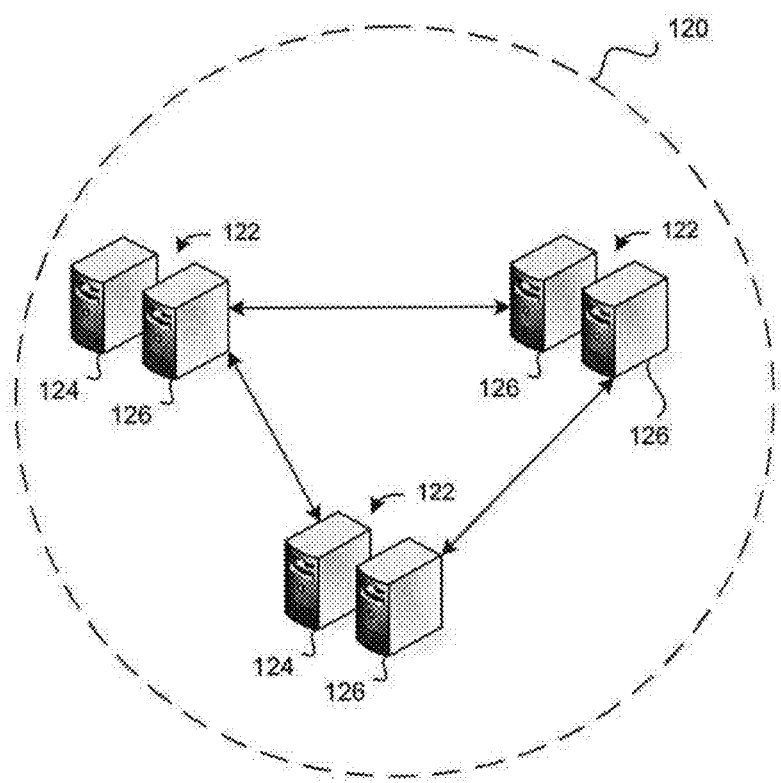
FIG. 1B is a detailed view of a server cluster in the communication system of FIG. 1A in accordance with an example embodiment of the present disclosure.

The SIP network 140 includes a number of clusters 120, identified individually as references 120a, 120b, . . . 120n, each cluster 120 including a number of nodes 122. As best shown in FIG. 1B, each node 122 in a cluster 120 is a SIP server which each comprises at least two separate logical entities, a SIP proxy server 124 and SIP registrar server 126. The SIP proxy server 124 and SIP registrar server 126 are provided in the same physical component or entity. Collectively, the clusters 120 of nodes 122 provide a SIP server farm. Each node 122 in a cluster 120 is a distinct physical component with a distinct physical IP address and/or FQDN (Fully Qualified Domain Name). A cluster 120 can be addressed through an external address, such as an IP address and/or FQDN. In other embodiments, the SIP proxy server 124 and SIP registrar server 126 can be different physical components or entities with appropriate modification to the methods described herein. The SIP network 140 may be used to provide Voice-over-Internet-Protocol (VoIP) via SIP.

The SIP proxy servers 124 act as intermediary entities, as both a server and a client, for the purpose of making requests on behalf of UAs 110. The SIP proxy servers 124 provide routing of SIP messages received from originating UAs 110 and may be used to enforce policies, such as the duration of SIP sessions. The SIP proxy servers 124 interpret and modify (e.g., rewrite) specific parts of a SIP message before routing the SIP message towards a terminating UA 110. A first UA 110 can send SIP messages to, and concurrently receive SIP messages, from a plurality of other UAs 110 using a SIP proxy server 124 in the cluster 120 as an intermediary. A single UA 110 may concurrently send messages to, or concurrently receive messages from, a plurality of other UAs 110.

As known to the skilled person, each SIP message contains a header which conveys information about the SIP message. The header is structured as a sequence of header fields. A header field can appear as one or more header field rows. Header field rows include a header field name and zero or more header field values. Multiple header field values on a given header field row are separated by commas. Some header fields can only have a single header field value, and as a result, appear as a single header field row.

Each UA 110, when connecting to the SIP network 140, addresses a particular cluster 120 via the external address of that cluster 120. The particular cluster 120 with which the UA 110 communicates, in at least some examples, is based on the geographical location of the clusters 120 and the UA 110. When the clusters 120 are geographically distributed, the UA 110 may connect to the cluster 120 which is the closest geographically to the UA 110. The IP address associated with the cluster 120 and the UA 110 may be used to determine the closest cluster 120.

Each UA 110 creates a persistent connection with a particular node 122 in a particular cluster 120 in the SIP network 140. The particular node 122 within a cluster 120 which the UA 110 connects to, in at least some examples, is determined dynamically, for example, using load balancing between the nodes 122 within the cluster 120 or Domain Name System (DNS) round robin. The permanent connection may be, for example, TCP connection, a Transport Layer Security (TLS) connection, Secure Sockets Layer (SSL) connection or other suitable type of persistent connection. TLS and SSL are cryptographic protocols which provide communications security over the Internet. TLS and SSL encrypt network connections above the transport layer using symmetric cryptography for privacy and a keyed message authentication code for message reliability. UAs 110 engaged in secure communications using TLS or SSL are provided with encryption key(s), which are typically stored in persistent memory of the UAs 110.

The persistent connection between the UA 110 and the particular node 122 in the particular cluster 120 is created by a SIP registrar server 126. The SIP registrar server 126 creates and renewed maintains an association between the UA 110 and its logical location known as a binding. Each binding specifies an address-of-record (AOR) and one or more contact addresses associated with the AOR. The contact addresses are specified, in at least some examples, as a Contact URI (Uniform Resource Identifier) of the UA 110 and provides the logical location of the UA 110. The combination of the AOR and the Contact URI provides a binding key which uniquely identifies a persistent connection. The Contact URI is typically an SIP or SIPS (SIP Secure) URI. An AOR is frequently thought of as the "public address" of the user. The AOR is a SIP or SIPS URI that points to a domain with a location service that can map the URI to another URI where the user may be available.

A given AOR may have multiple bindings. Bindings for a given AOR can be differentiated by the contact addresses (i.e., Contact URIs) associated with a particular UA device, or possibly other identifying information associated with a particular UA device. Each binding is identified by an AOR and identifying information for a particular device.

The Contact URI is specified by the UA 110 in a Contact header field of a REQUEST message (RFC 3261, section 20.10) when a SIP session is initiated or renewed during a SIP operation call known as registration. In at least some examples, the registration is performed over the persistent connection with the node 122 after persistent connection with has been established. A Contact header field value can contain a display name, a URI with URI parameters, and header parameters. Contact header parameters in addition to those defined in RFC 3261 may be defined by other standards or third parties, for example, to create specialized or proprietary Contact header parameters or Contact header URI parameters.

When a SIP session is initiated, and at periodic intervals thereafter, a UA 110 sends a REGISTER message to the node 122 in the cluster 120 which is responsible for maintaining the bindings for the UA 110. Each UA 110 is responsible for refreshing the bindings it has previously established as per RFC 3261 (section 10.2.4). During an initial registration for a UA 110, the particular node 122 within a cluster 120 which the UA 110 connects to, in at least some examples, is determined dynamically, for example, using load balancing between the nodes 122 within the cluster 120 or DNS round robin, thereby balancing the bindings of the UA 110 managed by the SIP registrar servers 126 between the nodes 122 within a cluster 120.

A REGISTER request adds, modifies (e.g., refreshes), removes or queries bindings, but does not initial a dialog. A REGISTER request can add a new binding between an AOR and one or more contact addresses. If more than one contact address (e.g., Contact URI) is included in a REGISTER request, the registering UA 110 intends to associate all of the URIs in these Contact header field values with the AOR present in the "To" field. Registration on behalf of a particular AOR can be performed by a suitably authorized third party. A client can also remove previous bindings or query to determine which bindings are currently in place for an AOR.

The SIP registrar servers 126 maintain a unique association between bindings and the persistent connections for various endpoints. The unique association may be at the application layer. The unique association comprises a one-to-one mapping between a connection identifier (ID) and the binding. The connection ID is assigned to the connection during an initial registration (e.g., binding) and may be, for example, a number. The persistent connections may be identified, for example, using procedures specified by RFC 5923. In at least some examples, one binding per persistent connection is supported by the SIP registrar server 126. When the SIP network 140 implements VoIP via SIP, one Call-ID per persistent connection is supported by the SIP registrar server 126 in at least some examples.

The binding may be identified using any suitable binding ID, such as the AOR. A binding key, in some examples, is used for UA identification during binding to prevent duplicate bindings from being formed in at least some examples. The binding key may be a configurable list of elements. The binding key is a combination of values of these elements. The binding key, in one embodiment, specifies a Contact URI and specified identifying information for a particular UA device. Bindings are treated as equivalent if all elements of binding key are the same. Other URI parts are ignored for the purpose of URI comparison.

The identifying information of the binding key is unique and immutable information provided by a UA 110 for a particular device so long as the device is used by the same user. Typically, the identifying information is globally unique, for example, to ensure that duplicate bindings are cannot be created. However, in other examples, uniqueness is required only among devices associated with the same AOR (or user). The identifying information comprises a unique identifier such as a unique user name, a unique alphanumeric identifier associated with the UA device (e.g., unique device identifier), or a combination thereof. The unique alphanumeric identifier may be a personal identification number (PIN). For example, the binding key may be "Contact: bob@192.168.0.2; pin=1234" where with Contact URI is "bob@192.168.0.2" and the PIN is "1234". The PIN is a unique alphanumeric identifier that uniquely identifies the particular device within a particular network, uniquely identifies the particular device to a device manufacturer, and/or uniquely identifies the particular device between device manufacturers. In some examples, the identifying information is a globally unique PIN. In some examples, the PIN is a globally unique 8-digit alphanumeric identifier. In other examples, the identifying information may be a unique user name and a unique identifier such as a PIN as described above. In other embodiments, a device serial number, Media Access Control (MAC) address or other unique identifier could be used instead of the PIN.

In at least examples, the binding key is specified by a combination of Contact header elements and/or Contact URI elements of the REGISTER message which excludes mutable parts which are conventionally part of the Contact URI, such as the host part. The identifying information may be provided as a proprietary Contact header parameter. Alternatively and/or additionally, the identifying information may be provided as a proprietary URI parameter. As noted above, Contact header parameters may be defined by other standards or third parties. The binding key provides a proprietary unique identifier (required scope of uniqueness is user) which allows registration operations to unambiguously distinguish bindings and maintain a single binding per device.

Each binding record specifies an AOR and one or more Contact URI(s) associated with a particular UA device. While any number of Contact URI(s) for a given AOR may be supported, it is unlikely that any AOR has more than 2 or 3 Contact URI(s) associated with it (i.e., more than 2 or 3 UA devices associated with it). Each binding record contains binding information which, in some examples, includes the AOR, binding key(s) (if applicable), Contact URI(s), an address of the node 122 which manages the bindings for the AOR, expiration timeout parameter(s), and VoIP parameter(s) such as Call-ID and Cseq (if applicable). The binding records may include a created timestamp, a last refresh timestamp and an expire timestamp for providing expiration timeout. The binding records may include identifying information about the UA device (e.g., PIN, typically for information only). The binding records may include the URI from the Request-URI (R-URI) field of the REGISTER message which created or possibly refreshed the binding, Each node 122 typically includes internal storage which stores binding information for UAs 110 with which the node 122 has a persistent connection. Each node 122 within a particular cluster 120 also has access to a persistent storage. The shared persistent storage is accessible to each node (e.g., each of the servers 124, 126) in a particular cluster 120 and can be updated by any SIP registrar server 126 in a particular cluster 120. The shared persistent storage stores binding information for all UAs 110 with which each node 122 in the particular cluster 120 has a persistent connection.

The shared persistent storage, in some embodiments, is a distributed cache 180, identified individually as references 180a, 180b, . . . 180n. The distributed cache 180, in at least some examples, is defined by a cache schema which represents a distributed map of bindings maintained by the nodes 122 in a particular cluster 120. The binding information is maintained by the SIP registrar servers 126 which create, store and maintain the bindings for a particular set of AORs. The shared persistent storage provides a shared registration repository in addition to the local storage of binding information maintained by the nodes 122. Normally only active bindings are stored in the distributed cache 180. When the last binding for a particular AOR is removed (i.e., no bindings remain for a particular AOR), the entire record may be removed from the distributed cache 180 for the particular AOR.

The bindings of UAs 110 may be identified and distinguished using URI comparison rules as described in RFC 3261 (section 19.1.4). The URI comparison rules specify, among other things, that the user, password, host and port components must match for two URIs to be equal. Typically, a UA 110 specifies a private IP address or public IP address as the host part. A public IP address and port may be obtained from a private IP address when the UA 110 is behind a firewall using, for example, Session Traversal Utilities for NAT (STUN) defined by RFC 5389, or a similar discovery mechanism.

RFC 3261, section 20.10, specifies the following rules for parsing a display name, URI and URI parameters, and header parameters of the Contact header field. When the Contact header field value contains a display name, the URI including all URI parameters is enclosed in "<" and ">". If no "<" and ">" are present, all parameters after the URI are header parameters, not URI parameters. The display name can be tokens, or a quoted string, if a larger character set is desired. Even if the "display-name" is empty, the "name-addr" form may be used if the "addr-spec" contains a comma, semicolon, or question mark. There may or may not be LWS between the display-name and the "<".

The SIP registrar server 126, in at least some examples, may set a value of an expiration timeout parameter which defines an expiration interval of a binding. The SIP registrar server 126 sets the value of the expiration timeout parameter in response to requests to add or modify (e.g., refresh) a binding received, for example, in REGISTER messages. While the UA 110 may suggest the expiration interval through the Expires header field or an "expires" Contact header parameter in a REGISTER message, the SIP registrar server 126 selects the actual time interval based on its local policy. For example, local policy typically specifies a maximum value (i.e., maximum time interval) for the expiration interval for UAs 110. A SIP registrar server 126 may support different policies for different UAs 110 so long as SIP registrar servers 126 in the same cluster 120 (or same domain) apply the same policy rules. However, SIP registrar servers 126 in the same cluster 126 apply the same policy to a particular UA 110. For example, local policy may allow the maximum value of the expiration time interval to vary between UAs 110. When a number of bindings exist for a particular AOR, each binding may have a different expiration interval. When the expiration interval for a particular binding expires, the binding is removed by the SIP registrar server 126 from at least the distributed cache 180.

The "expires" Contact header parameter allows expiration intervals to be suggested on a per-binding basis when more than one binding is given in a single REGISTER message, whereas the Expires header field suggests an expiration interval for all Contact header field values. The value of the "expires" Contact header parameter and Expires header field is typically a number indicating seconds. If neither is present in a REGISTER message, the client is indicating its desire for the SIP registrar server 126 to choose the expiration interval based on its local policy.

All bindings expire unless refreshed; however, bindings can also be explicitly removed. A UA 110 requests the immediate removal of a binding by specifying an expiration interval of "0" for that contact address in a REGISTER request. A Contact header field value of "*" may be used to remove all bindings associated with an AOR without knowing their precise values.

REGISTER messages sent by a UA 110 specify a Contact URI of the UA 110 as the current location of the UA 110 in the Contact header field of the REGISTER message. The UA 110 is identified by an AOR specified in the "To" header field of the REGISTER message. The SIP registrar server 126 sends a 200 (OK) message to a UA 110 when a REGISTER message is successfully processed. The 200 (OK) message from the SIP registrar server 126 contains a list of Contact fields enumerating current bindings. The 200 (OK) message may contain several Contact fields or a list of addresses in a Contact field. The UA 110 compares each contact address using comparison rules in RFC 3261 (section 19.1.4) to determine whether it created the contact address. If the UA 110 created the contact address, the UA 110 updates the expiration interval according to the "expires" parameter or, if absent, the Expires header field value. The UA 110 then issues a REGISTER request for each of its bindings before the expiration interval has elapsed. The UA 110 may combine several updates into one REGISTER request.

The SIP registrar server 126, in at least some embodiments, may set a value of an idle timeout parameter which defines an idle timeout interval for a list of bindings associated with a particular AOR. The idle timeout interval specifies a time interval in which the list of bindings stored in the distributed cache 180 is permitted to remain inactive. The value of the idle timeout parameter is set to the maximum allowed registration period, i.e., the maximum expiration timeout parameter value permitted by the SIP registrar server 126. This ensures that binding entries are not removed from the distributed cache 180 for a lack of activity prior to the expiration of the expiration interval. The idle timeout parameter allows binding entries with no activity for a threshold period of time (e.g., the idle timeout interval) to be automatically removed without a watch dog procedure implemented by the SIP registrar server 126 or external clean-up procedure. A watch dog procedure or external clean-up procedure would use scanning the distributed storage, detecting expired binding, and detaching expired bindings. This procedure is very inefficient, especially when the shared distributed storage (such as distributed cache) has limited query capabilities.

The list of bindings for a particular AOR may be updated whenever there is any activity for the AOR. In one embodiment, the updating comprises updating the value of the idle timeout parameter for the list of bindings in the shared registration repository for the AOR and optionally the logical location of the AOR. The activity could be a new binding (e.g., registration), location query, binding removal or binding refresh. This approach may reduce the number of stale bindings, is relatively efficient and accounts for circumstances in which there is no activity for the particular AOR. In an alternate embodiment, the updating does not use the idle timeout parameter described above. The activity could be a new binding (registration), location query or any other activity for the AOR. This approach may reduce the number of stale bindings and is relatively efficient, but does not account for circumstances in which there is no activity for the particular AOR.

The expiration timeout parameter and/or idle timeout parameter may be implemented as a timestamp such that bindings having an expiration timeout parameter timestamp and/or idle timeout parameter timestamp which have expired can be automatically removed by the SIP registrar server 126 rather than a countdown timer or other mechanism for monitoring time intervals.

The SIP registrar server 126 also stores the location of the UAs 110 for a particular cluster 120 (or domain) in a location database of a location service. The location database is accessible by nodes 122 in the particular cluster 120 (or domain) to locate UAs 110. The location database, in the shown embodiment, is a global Lightweight Directory Access Protocol (LDAP) database (DB) 160. The location database is globally accessible to all clusters 120 in the SIP network 140. Each SIP registrar server 126 is responsible for requesting updates in the location database in respect of the bindings that the SIP registrar server 126 maintains. In some example embodiments, the SIP registrar server 126 does not remove records from location database. This maintains AOR information in the location database and facilitates dialog continuation when a UA 110 reconnects to the SIP network 140 in the event of a node failure, or possibly after expiration of the binding after the expiration interval for a particular binding expires. Typically, binding information is not stored in the location database.

Each record in the location database has the following elements: (i) AOR, (ii) identifying information for a particular UA device; and (iii) a cluster address for the cluster 120 which specifies the address of the last known node 122 to maintain the binding for a particular UA 110 on a particular device. The location database may be optimized for many reads and a relatively small number of updates/additions to provide fast update and retrieval. The combination of the AOR and identifying information is globally unique and allows a cluster address to be determined based on either the AOR or AOR and Contact URI.

The location database may be updated in the following conditions: (i) a new device is registered for the first time (e.g., a new record is added); (ii) a device is moved from one subscriber to another, or a subscriber AOR has changed (e.g., a new record is added); or (iii) a device is registered at a different cluster 120 (e.g., record is updated).

While an example embodiment of the location database and registration repository has been described above for the purpose of illustration, this is not intended to be limiting and different schema could be applied for one or both of these elements in other embodiments. For example, the location database and registration repository could be combined in a single entity.

The wireless communication network 101 may comprise one or more of a Wireless Wide Area Network (WWAN) 102 and a Wireless Local Area Network (WLAN) 104 or other suitable network arrangements. The UAs 110 may be configured to communicate over both the WWAN 102 and WLAN 104, and to roam between these networks. The wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1A) where each of the base stations 108 provides wireless Radio Frequency (RF) coverage to a corresponding area or cell. The WWAN 102 is typically operated by a mobile network service provider that provides subscription packages to UAs 110. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), Ev-DO (Evolution-Data Optimized) CDMA2000, EDGE (Enhanced Data rates for GSM Evolution), UMTS (Universal Mobile Telecommunication Systems), HSDPA (High-Speed Downlink Packet Access), IEEE 802.16e (also referred to as Worldwide Interoperability for Microwave Access or "WiMAX"), IEEE 802.16m (also referred to as Wireless Metropolitan Area Networks or "WMAN"), 3GPP Long Term Evolution (LTE), LTE Advanced, IEEE 802.20 (also referred to as Mobile Broadband Wireless Access or "MBWA") or various other suitable network types. Although WWAN 102 is described as a "Wide-Area" network, that term is intended herein to incorporate other similar technologies for providing coordinated service wirelessly over an area larger than that covered by typical WLANs.

The WWAN 102 may further comprise a wireless network gateway 109 which connects the UAs 110 to transport facilities 112, and through the transport facilities 112 to the SIP network 140 which is typically located behind a firewall 130. Transport facilities 112 may include one or more private networks or lines, the public internet, a virtual private network, or any other suitable network.

The WLAN 104 comprises a wireless network which, in some embodiments, conforms to IEEE 802.11x standards (sometimes referred to as Wi-Fi) such as, for example, the IEEE 802.11a, 802.11b, 802.11g and/or 802.11n standard. The WLAN 104 includes one or more wireless RF Access Points (APs) 114 (one of which is shown in FIG. 1A) that collectively provide a WLAN coverage area. The WLAN 104 may be a personal network of the user, an enterprise network, or a hotspot offered by an internet service provider (ISP), a mobile network provider, or a property owner in a public or semi-public area, for example. The access points 114 are connected to an AP interface 116 which may connect to the transport facilities 112.

The above-described communication system is provided for the purpose of illustration only and is only one example of a multitude of possible communication network configurations which may be used. The teachings of the present disclosure may be employed in connection with other communication network configurations.

User Agent Construction

Figure 7:
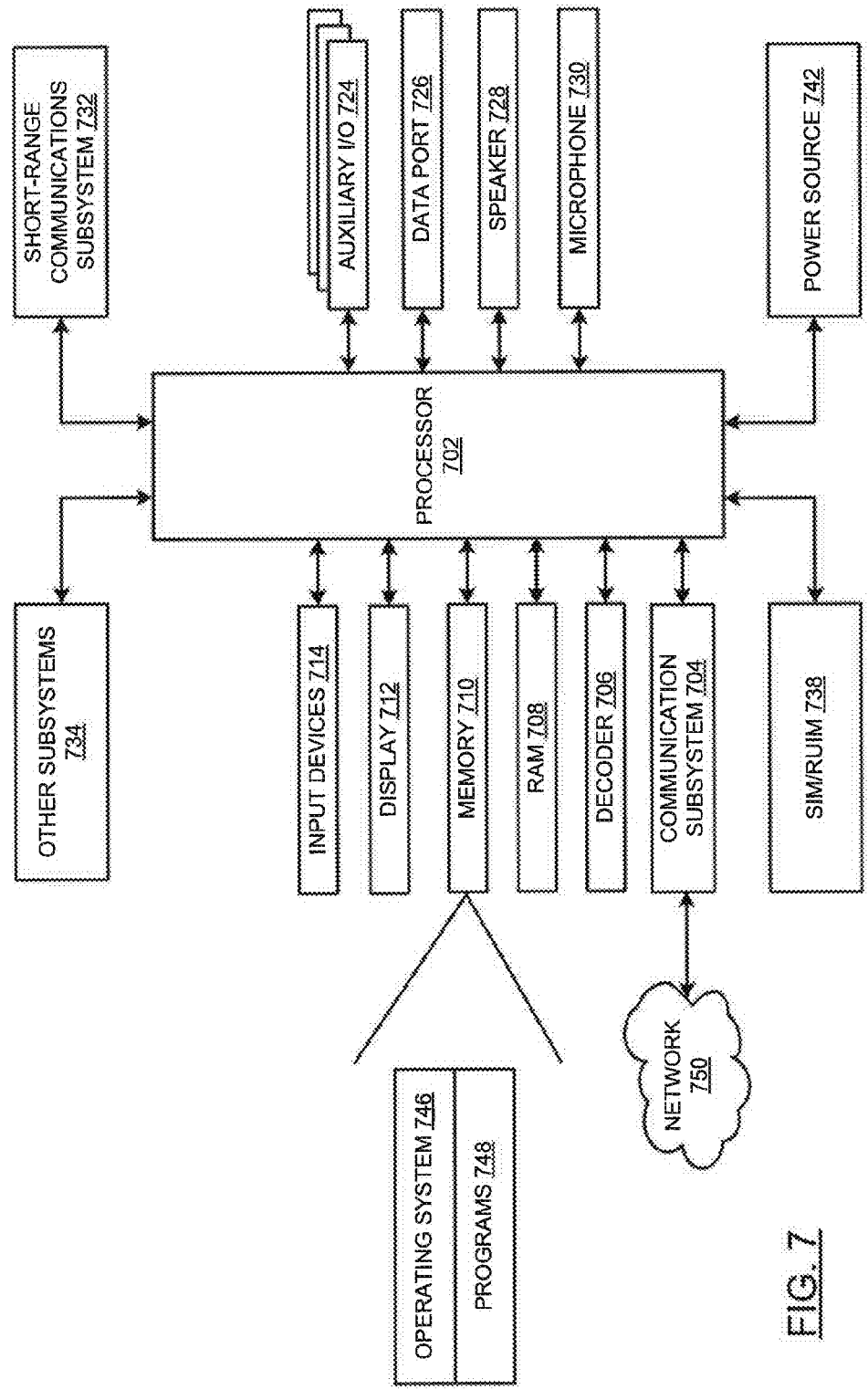
FIG. 7 is a simplified block diagram of components of a mobile device suitable for use as a user agent for carrying out aspects of the present disclosure.

Reference is next made to FIG. 7 which illustrates in block diagram form a mobile device suitable for use as an UA 110 in example embodiments. The mobile device includes multiple components, such as a processor 702 that controls the overall operation of the mobile device. Communication functions, including data and voice communications, are performed through a communication subsystem 704. Data received by the mobile device is decompressed and decrypted by a decoder 706. The communication subsystem 704 receives messages from and sends messages to the wireless network 101. The wireless network 101 may be any type of wireless network, including, but not limited to, data wireless networks, voice wireless networks, and networks that support both voice and data communications. Communications exchanged with the wireless network 101 may be encrypted, for example, using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data.

The processor 702 interacts with other components, such as Random Access Memory (RAM) 708, memory 710 such as flash memory, a display 712 (such as a liquid crystal display (LCD)), input device(s) 714 such as a keyboard and navigation device, one or more auxiliary input/output (I/O) subsystems 724, a data port 726, a speaker 728, a microphone 730, a short-range wireless communication subsystem 732 and other device subsystems 734. A power source 742, such as one or more rechargeable batteries or a port to an external power supply, powers the mobile device. User-interaction with a graphical user interface (GUI) rendered and displayed on the display 712 via the processor 702 is performed using the input device(s) 714. The GUI displays user interface screens on the display 712 which display information such as text, characters, symbols, images, icons, and other items.

To identify a subscriber for network access, the mobile device uses a Subscriber Identity Module or a Removable User Identity Module (SIM/RUIM) card 738 for communication with a network, such as the wireless network 101. Alternatively, user identification information may be programmed into memory 710.

The short-range wireless communication subsystem 732 provides a short-range wireless communication interface. The short-range wireless communication interface is typically Bluetooth® interface but may be another type of short-range wireless communication interface including, but not limited to, an infrared (IR) interface such as an Infrared Data Association (IrDA) interface, an IEEE 802.15.3a interface (also referred to as UltraWideband (UWB)), Z-Wave interface, ZigBee interface or other suitable short-range wireless communication interface.

The mobile device includes an operating system 746 and software applications 748 that are executed by the processor 702 and are typically stored in a persistent, updatable storage such as the memory 710. Additional applications 748 may be loaded onto the mobile device through the wireless network 101, the auxiliary I/O subsystem 724, the data port 727, the short-range wireless communication subsystem 732, or any other suitable subsystem 734.

A received signal such as a text message, an e-mail message, or web page download is processed by the communication subsystem 704 and input to the processor 702. The processor 702 processes the received signal for output to the display screen 712 and/or to the auxiliary I/O subsystem 724. A subscriber may generate data items, for example e-mail messages, which may be transmitted over the wireless network 101 through the communication subsystem 704. For voice communications, the overall operation of the mobile device is similar. The speaker 728 outputs audible information converted from electrical signals, and the microphone 730 converts audible information into electrical signals for processing.

A network component, such as a SIP server, comprises a processor, communication subsystem, memory having software in the form of program instructions for controlling its operation stored thereon, and a power source. Input device(s) and output device(s) may or may not be provided depending on whether the network component is intended for direct interaction with a user. A network component may have a construction similar to the UA 110 in FIG. 7.

Routing SIP Messages Between Proper Endpoints

In accordance with one aspect of the present disclosure, there is provided a system and method to preserve dialogs in clustered environments, such as a SIP network (or SIP registrar/proxy server farm), in case of node failure. As mentioned previously, each cluster in the SIP network 140 includes two or more server nodes 122 each comprising a SIP registrar/proxy server. Endpoints, such as UAs 110, use persistent connections which are distributed between the server nodes 122 in the SIP network 140 using, for example, load balancing or DNS round robin. This allows every endpoint to be reached using a persistent connection from a particular node 122. Binding information (i.e., logical location information regarding the various endpoints and/or UAs 110) is stored in a persistent storage, such as the distributed cache 180, which is shared by all nodes 122 within a cluster 120. Binding information is typically not shared between the clusters 120 in the SIP network 140. In the event of a node failure within a particular cluster 120, binding information associated with the failed node 122 remains available to other nodes 122 within that cluster 120 despite connection termination because of the shared persistent storage between the nodes 122 within the cluster 120. This allows UAs 110 which had a persistent connection to the failed mode to reconnect to an available node 122 in that cluster 120, as described more fully below.

In clustered environments in which persistent connections are used between endpoints and servers (e.g., between UAs 110 and proxy servers), there is a need to be able to locate the server (e.g., node 122) at which an endpoint maintains its persistent connection so that subsequent requests in the same dialog can be routed correctly. Failure of a node (i.e., proxy server) can cause routing problems in dialogs for endpoints having a persistent connection which was maintained by the failed node. In accordance with the present disclosure, originating and terminating endpoints having a persistent connection which was maintained by the failed node create a new persistent connection to a new node in the middle of the dialog provides a system and method to preserve dialogs in clustered environment in the event of node failure.

The present disclosure describes a method of routing messages such that requests and/or responses are routed to endpoints based on a unique association between bindings and persistent connections ensuring messages are routed to the proper endpoint even in the case of node failure. The method extends the use of information stored in Record-Route inserted by a stateful proxy to provide a robust routing methodology which is able to survive a node failure and enable the dialogs to be continued on a new persistent connection to a new node created in response to failure of a node maintaining a particular binding. Pursuant to RFC 3261, a stateful proxy that wishes to remain on the path of future requests in a dialog inserts a Record-Route header which can be resolved to the network element (e.g., proxy server) which inserts the Record-Route header field so that subsequent requests will reach the same network element. A public stateful proxy can insert its IP address/FQDN in the Record-Route header to survive node failures. When the stateful proxy is located behind a firewall, the stateful proxy can insert information about the dialog (i.e., AOR) of terminating device, cluster address, and/or URI of original REGISTER request) in the Record-Route header so that subsequent requests can still be routed to same endpoint independent of the new node servicing the requests to survive node failures.

Figure 2:
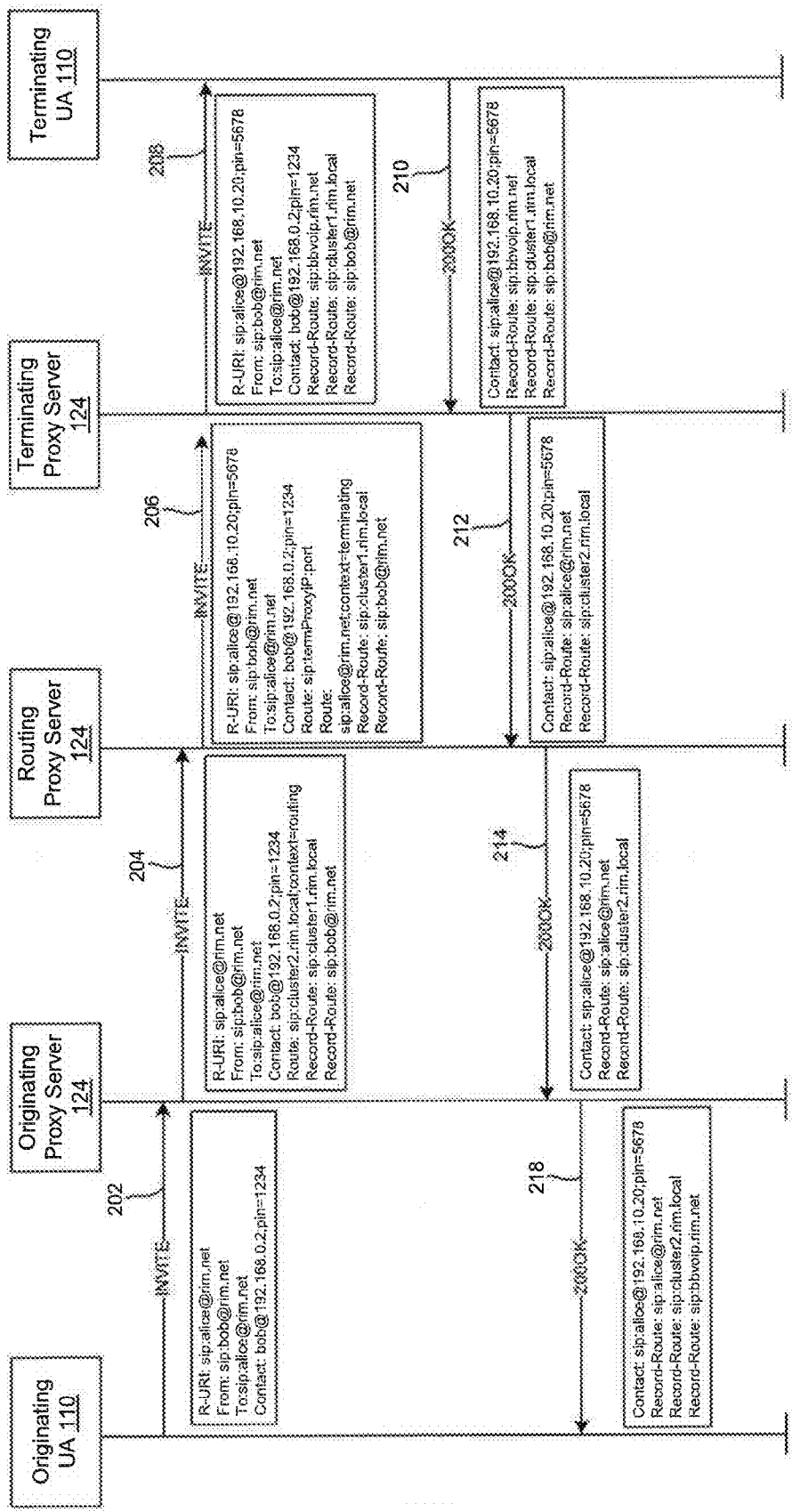
FIG. 2 is a flow diagram of an Initial Transaction Call in a SIP session when the originating and terminating devices are not in the same cluster in accordance with one embodiment of the present disclosure.

FIG. 2 is a flow diagram of an Initial Transaction Call in a SIP session when the originating and terminating devices are not in the same cluster 120 in accordance with one embodiment of the present disclosure. The operations performed by the network components may be more or less than described and may be performed in a different order provided the event flow described below remains the same. At event 202, an originating UA 110 sends an INVITE request to an originating proxy server 124. The initial request starts an SIP dialog between the originating UA 110 and a terminating UA 110, which will typically comprise a number of SIP transactions between the originating UA 110 and terminating UA 110. It will be appreciated that the terms the originating UA and terminating UA, as used herein, applies to each transaction after the SIP session is initiated.

The INVITE request does not contain Route or Record-Route headers. In the shown example, the header of the initial request is as follows:
R-URI: sip:alice@rim.net
From: sip:bob@rim.net
To: sip:alice@rim.net
Contact: bob@192.168.0.2; pin=1234

The originating proxy server 124 receives the INVITE request retrieves an AOR ("sip:bob@rim.net" in the shown example) associated with the connection of the originating UA 110 from internal storage. This is the AOR which has a binding on the persistent connection. The originating proxy server 124 optionally validates that the AOR matches the address in the From header.

The originating proxy server 124 retrieves a list of clusters having bindings for the called subscriber based on the AOR associated with the connection of the originating UA 110. The originating proxy server 124 identifies, using the location database (e.g., the LDAP DB 160), the cluster 120 in which the node 122 with which the terminating UA 110 has a persistent connection is located (cluster2 in the shown example). The originating proxy server 124 cannot, however, determine the particular node 122 with which the terminating UA 110 has a persistent connection.

The originating proxy server 124 adds a first Record-Route header with a value of the cluster address (e.g., cluster FQDN) of the cluster of the originating proxy server 124 with which the originating UA 110 has a persistent connection (cluster1 in the shown example). The cluster address causes subsequent messages to be directed to a load balancer in cluster1. The load balancer is typically a dedicated network component but could be a node 122 in the cluster 120 in other embodiments. The originating proxy server 124 also adds a second Record-Route header with the AOR associated with the persistent connection of the originating UA 110.

The originating proxy server 124 also sets a Route header with an address of a Record-Routing proxy server 124 (also referred to as a Routing proxy server 124 for convenience) because the originating and terminating devices are not in the same cluster, with an address in the form of "sip:cluster-FQDN;context=routing" ("sip:cluster2.rim.local; context=routing" in the shown example). The content parameter "routing" is used to instruct the receiving node 122 in cluster2 to handle the message in the role of a routing proxy server.

At event 204, the originating proxy server 124 sends the modified INVITE request to all clusters 120 having bindings for the called subscriber. Typically, only one cluster 120 will have a binding for the called subscriber (e.g., AOR). When more than one cluster 120 has a binding for the called subscriber, a modified INVITE request for each a Record-Routing proxy server 124. The Record-Routing proxy server 124 performs record-routing, a SIP mechanism which allows SIP proxy servers to request to be included in the signalling path of all future requests which belong to a SIP dialog. A proxy server which does not Record-Route an INVITE message should not expect to receive any of the further requests. A Record-Routing proxy server typically implements the following functionality: route information pre-processing; route information post-processing; rewriting Record-Route headers in responses; symmetric Record-Route; and Loose-Routing.

A Record-Routing proxy server 124 in cluster2 receives the modified INVITE request, removes the Route header and retrieves the bindings for the AOR of the terminating UA 110 (specified in the R-URI header). Because the Record-Routing proxy server 124 is in the same cluster 120 as the node 122 which manages the connection for the called subscriber, the Record-Routing proxy server 124 can retrieve the binding information for the called subscriber from the distributed cache 180 of cluster2. In some cases, the Record-Routing proxy server 124 and the terminating proxy server 124 could be on the same node 122. The Record-Routing proxy server 124 updates the R-URI Field to the binding of the terminating UA 110 ("sip:alice@192.168.10.20;pin=5678" in the shown example) and adds a first new Route header with the address of the terminating proxy server 124 so that the request will be sent to terminating proxy server 124. The Record-Routing proxy server 124 also sets a second new Route header with a "bound" AOR retrieved from the R-URI field and a context parameter "terminating". The content parameter "terminating" is used to instruct the receiving node 122 in cluster2 to handle the message in the role of a terminating proxy server.

At event 206, the Record-Routing proxy server 124 sends the modified INVITE request to the terminating proxy server 124. The Record-Routing proxy server 124 sends the modified INVITE request to all nodes 122 that maintain bindings for the AOR. The terminating proxy server 124 removes the top-most Route header which includes the node address and retrieves a binding from internal storage using the AOR from the second Route header and Contact URI from the R-URI header. The terminating proxy server 124 also removes the second Route header. A third new Record-Route header is set as the top-most Record Route header with an R-URI retrieved from the SIP registrar server 126 which maintains the binding for the AOR ("sip:bbvoip.rim.net") of the terminating UA 110. The new Record-Route header identifies the SIP network 140 and ensures that UAs 110 send subsequent messages over connection used for registration.

At event 208, the terminating proxy server 124 sends the modified INVITE request, with three Record-Route headers, to the terminating UA 110. The terminating UA 110 now has the cluster address of the node 122 which maintains the persistent connection of the originating UA 110 (cluster1) and the address of the originating UA 110. This allows communications to proceed even if the node 122 in cluster1 which maintains the persistent connection of the originating UA 110 fails, since cluster1 will allocate a new node 122 to the originating UA 110 using load balancing or DNS round robin.

At event 210, the terminating UA 110 sends a 200OK message to the terminating proxy server 124 indicating that the INVITE request was successfully processed. The 200OK message includes the same three Record-Route headers that were included in the INVITE request which it received. The terminating proxy server 124 also removes all three Record-Route records and adds two new Record-Route headers. The terminating proxy server 124 adds a first Record-Route with the AOR of the terminating UA 110 ("sip:alice@rim.net") and a second Record-Route header with the cluster address (e.g., cluster FQDN) of the terminating proxy server 124 ("sip:cluster2.rim.local").

At event 212, the terminating proxy server 124 sends the modified 200OK message including the two Record-Route headers to the Record-Routing proxy server 124. The Record-Routing proxy server 124 does not further modify the 200OK message.

At event 214, the Record-Routing proxy server 124 sends the 200OK message including the two Record-Route headers to the originating proxy server 124. The originating proxy server 124 adds a Record-Route header with the R-URI received at the SIP registrar server 126 which maintains the binding for the AOR ("sip:bbvoip.rim.net"). The new Record- Route header identifies the SIP network 140 and ensures that UAs 110 send subsequent messages over connection used for registration.

At event 218, the originating proxy server 124 sends the modified 200OK message including the three Record-Route headers to the originating UA 110. The originating UA 110 now has the cluster address of the node 122 which maintains the persistent connection of the terminating UA 110 (cluster2) and the address of the terminating UA 110. This allows communications to proceed even if the node 122 in cluster2 which maintains the persistent connection of the terminating UA 110 fails, since cluster2 will allocate a new node 122 to the terminating UA 110 using load balancing or DNS round robin.

Figure 3:
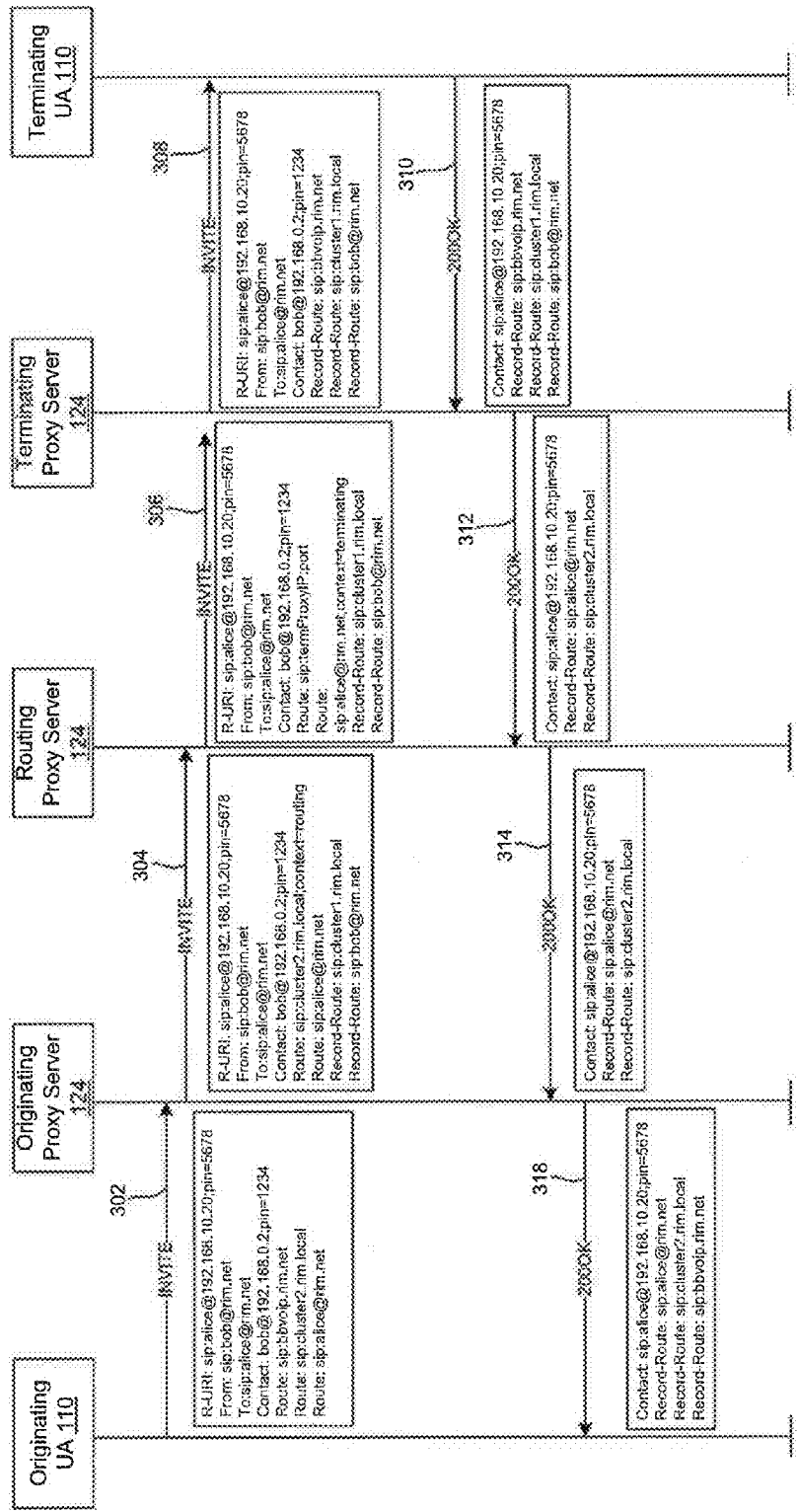
FIG. 3 is a flow diagram of an In-Dialog Transaction Call in a SIP session when the originating and terminating devices are not in the same cluster in accordance with one embodiment of the present disclosure.

FIG. 3 is a flow diagram of an In-Dialog Transaction Call in a SIP session when the originating and terminating devices are not in the same cluster 120 in accordance with one embodiment of the present disclosure. The operations performed by the network components may be more or less than described and may be performed in a different order provided the event flow described below remains the same. At event 302, an originating UA 110 sends an INVITE request to an originating proxy server 124.

The INVITE request does not contain a Record-Route header but does contain three Route headers. In the shown example, the header of the initial request is as follows:

R-URI: sip:alice@192.168.10.20;pin=5678
From: sip:bob@rim.net
To: sip:alice@rim.net
Contact: bob@192.168.0.2;pin=1234
Route: sip:bbvoip.rim.net
Route: sip:cluster2.rim.local
Route: sip:alice@rim.net The Route headers include the address of the terminating UA 110, the AOR of the terminating UA 110, and the cluster address of the node 122 which maintains the persistent connection of the terminating UA 110. The originating proxy server 124 removes the top-most Route header and sets a first Record-Route header with the AOR associated with the persistent connection ("sip:bob@rim.net").

The originating proxy server 124 adds a first Record-Route header with a value of the cluster address (e.g., cluster FQDN, "sip:cluster1.rim.local") of the cluster of the originating proxy server 124 with which the originating UA 110 has a persistent connection (cluster1 in the shown example). The cluster address causes subsequent messages to be directed to a load balancer in cluster1. The load balancer is typically a dedicated network component but could be a node 122 in the cluster 120 in other embodiments. The originating proxy server 124 also adds a second Record-Route header with the AOR associated with the persistent connection of the originating UA 110. The originating proxy server 124 also adds the content parameter "routing" to the top-most Route header to instruct the receiving node 122 in cluster2 to handle the message in the role of a routing proxy server.

At event 304, the originating proxy server 124 sends the modified INVITE request to a Record-Routing proxy server 124 because the originating and terminating devices are not in the same cluster 120. The Record-Routing proxy server 124 in cluster2 receives the modified INVITE request, removes the Route header and retrieves the bindings for the AOR of the terminating UA 110 (specified in the R-URI header). The Record-Routing proxy server 124 queries the distributed cache 180 to retrieve the node 122 that holds the bindings for the called subscriber. The QUERY request uses the binding from the R-URI. The Record-Routing proxy server 124 also adds a new top-most Route header with the address of the terminating proxy server 124 and a content parameter "terminating" to instruct the receiving node 122 in cluster2 to handle the message in the role of a terminating proxy server.

At event 306, the Record-Routing proxy server 124 sends the modified INVITE request to the terminating proxy server 124 that maintains the target binding. The terminating proxy server 124 removes the first Route header including the node address, and retrieves a binding from internal storage using the AOR from the removed Route header and contact from the R-URI header. The terminating proxy server 124 also removes the second Route header. A Record-Route header is set with an R-URI received at the SIP registrar server 126 which maintains the binding for the AOR ("sip:bbvoip.rim.net"). The new Record-Route header identifies the SIP network 140 and ensures that UAs 110 send subsequent messages over connection used for registration.

At event 308, the terminating proxy server 124 sends the modified INVITE request, with three Record-Route headers, to the terminating UA 110. The terminating UA 110 now has the cluster address of the node 122 which maintains the persistent connection of the originating UA 110 (cluster1) and the address of the originating UA 110. This allows communications to proceed even if the node 122 in cluster1 which maintains the persistent connection of the originating UA 110 fails, since cluster1 will allocate a new node 122 to the originating UA 110 using load balancing or DNS round robin.

At event 310, the terminating UA 110 sends a 200OK message to the terminating proxy server 124 indicating that the INVITE request was successfully processed. The 200OK message includes the same three Record-Route headers that were included in the INVITE request which it received. The terminating proxy server 124 also removes all three Record-Route records and adds new Record-Route headers. The terminating proxy server 122 adds a first Record-Route with the AOR of the terminating UA 110 ("sip:alice@rim.net") and a second Record-Route header with the cluster address (e.g., cluster FQDN) of the terminating proxy server 122 ("sip:cluster2.rim.local").

At event 312, the terminating proxy server 124 sends the modified 200OK message including the two Record-Route headers to the Record-Routing proxy server 124. The Record-Routing proxy server 124 does not further modify the 200OK message.

At event 314, the Record-Routing proxy server 124 sends the 200OK message including the two Record-Route headers to the originating proxy server 124. The originating proxy server 124 adds a Record-Route header with the R-URI received at the SIP registrar server 126 which maintains the binding for the AOR ("sip:bbvoip.rim.net"). The new Record-Route header identifies the SIP network 140 and ensures that UAs 110 send subsequent messages over connection used for registration.

At event 318, the originating proxy server 124 sends the modified 200OK message including the three Record-Route headers to the originating UA 110. The originating UA 110 now has the cluster address of the node 122 which maintains the persistent connection of the terminating UA 110 (cluster2) and the address of the terminating UA 110. This allows communications to proceed even if the node 122 in cluster2 which maintains the persistent connection of the terminating UA 110 fails, since cluster2 will allocate a new node 122 to the terminating UA 110 using load balancing or DNS round robin.

Figure 4:
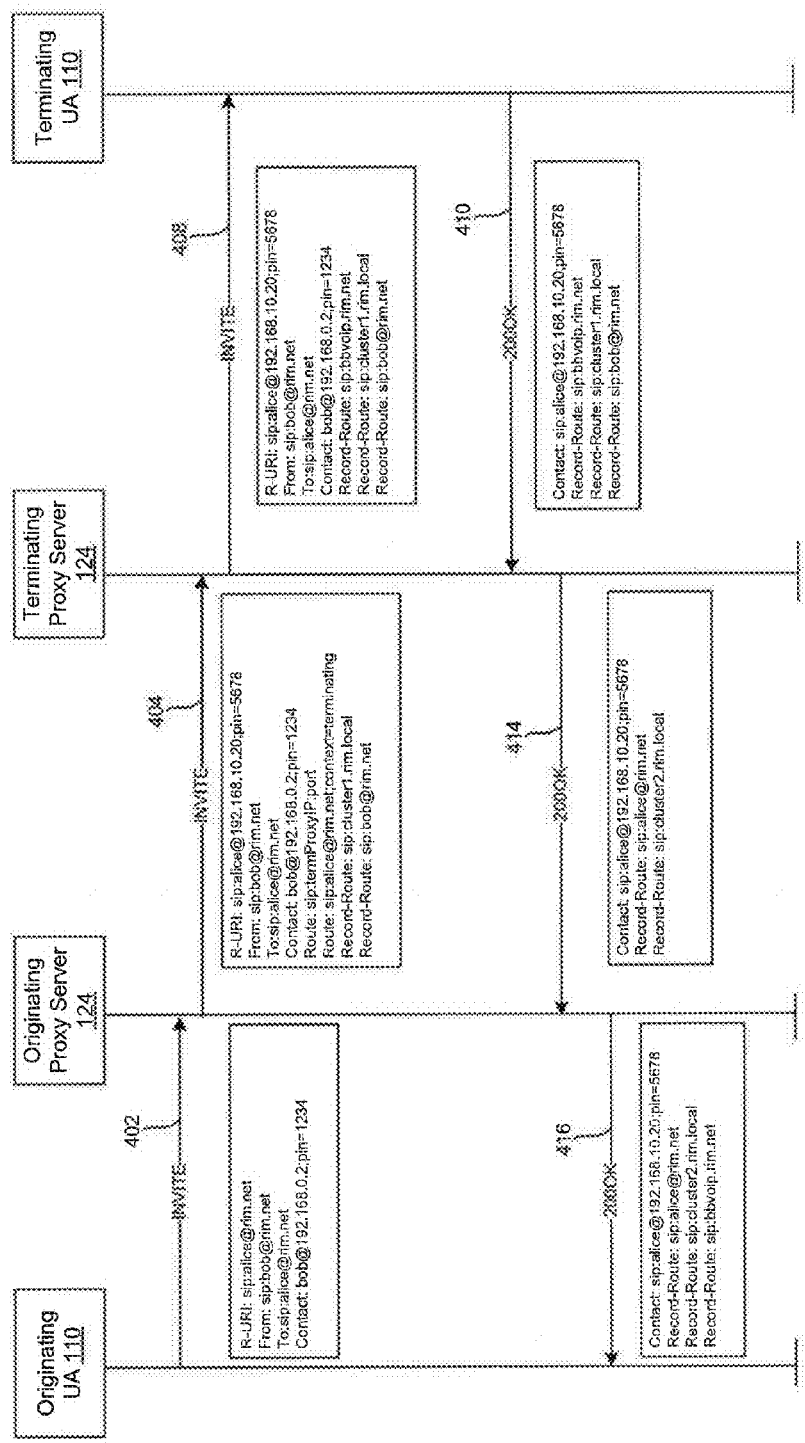
FIG. 4 is a flow diagram of an Initial Transaction call in a SIP session in which a Record-Routing proxy server is bypassed in accordance with one embodiment of the present disclosure.

FIG. 4 is a flow diagram of an Initial Transaction call in a SIP session in which a Record-Routing proxy server is bypassed in accordance with one embodiment of the present disclosure. The operations performed by the network components may be more or less than described and may be performed in a different order provided the event flow described below remains the same. When the originating and terminating devices are on the same cluster 120, the Record-Routing proxy server 124 is bypassed.

At event 402, an originating UA 110 sends an INVITE request to an originating proxy server 124. The INVITE request does not contain a Record-Route header. In the shown example, the header of the initial request is as follows:
R-URI: sip:alice@rim.net
From: sip:bob@rim.net
To: sip:alice@rim.net
Contact: bob@192.168.0.2;pin=1234

The originating proxy server 124 retrieves an AOR associated with the connection of the originating UA 110. This is the AOR which has binding on the persistent connection. The originating proxy server 124 optionally validates that the AOR matches the From header. The originating proxy server 124 adds a first Record-Route header with the value of the cluster FQDN and a second Record-Route header with the AOR associated with the connection. The originating proxy server 124 retrieves bindings for this cluster for the AOR specified in the R-URI header.

The originating proxy server 124 also adds a first Route header with the address of the terminating proxy server 124 so that the request will be sent to terminating proxy server 124. The originating proxy server 124 also adds a second Route header with a "bound AOR" retrieved from the R-URI field and a "context=terminating" parameter.

At event 404, the originating proxy server 124 sends the modified INVITE request to the terminating proxy server 124. The originating proxy server 124 sends the modified INVITE request to all nodes which maintain bindings for the AOR. The terminating proxy server 124 removes the first and second Route headers. A new third Record-Route header is added as the top-most Record-Route header with a value of an R-URI received from the SIP registrar server which maintains the binding for the AOR ("sip:bbvoip.rim.net"). The new Record-Route header identifies the SIP network 140 and ensures that UAs 110 send subsequent messages over connection used for registration.

At event 408, the terminating proxy server 124 sends the modified INVITE request, with three Record-Route headers, to the terminating UA 110.

At event 410, the terminating UA 110 sends a 200OK message to the terminating proxy server 124 indicating that the INVITE request was successfully processed. The 200OK message includes the same three Record-Route headers that were included in the INVITE request which it received. The terminating proxy server 124 also removes all three Record-Route records and adds new Record-Route headers. The terminating proxy server 124 adds a first Record-Route with the AOR of the terminating UA 110 ("sip:alice@rim.net") and a second Record-Route header with the cluster address (e.g., cluster FQDN) of the terminating proxy server 122 ("sip:cluster2.rim.local").

At event 414, the terminating proxy server 124 sends the modified 200OK message including the two Record-Route headers to the originating proxy server 124. The originating proxy server 124 adds a Record-Route header with the R-URI received at the SIP registrar server 126 which maintains the binding for the AOR ("sip:bbvoip.rim.net"). The new Record-Route header identifies the SIP network 140 and ensures that UAs 110 send subsequent messages over connection used for registration.

At event 416, the originating proxy server 124 sends the modified 200OK message including the three Record-Route headers to the originating UA 110.

Figure 5:
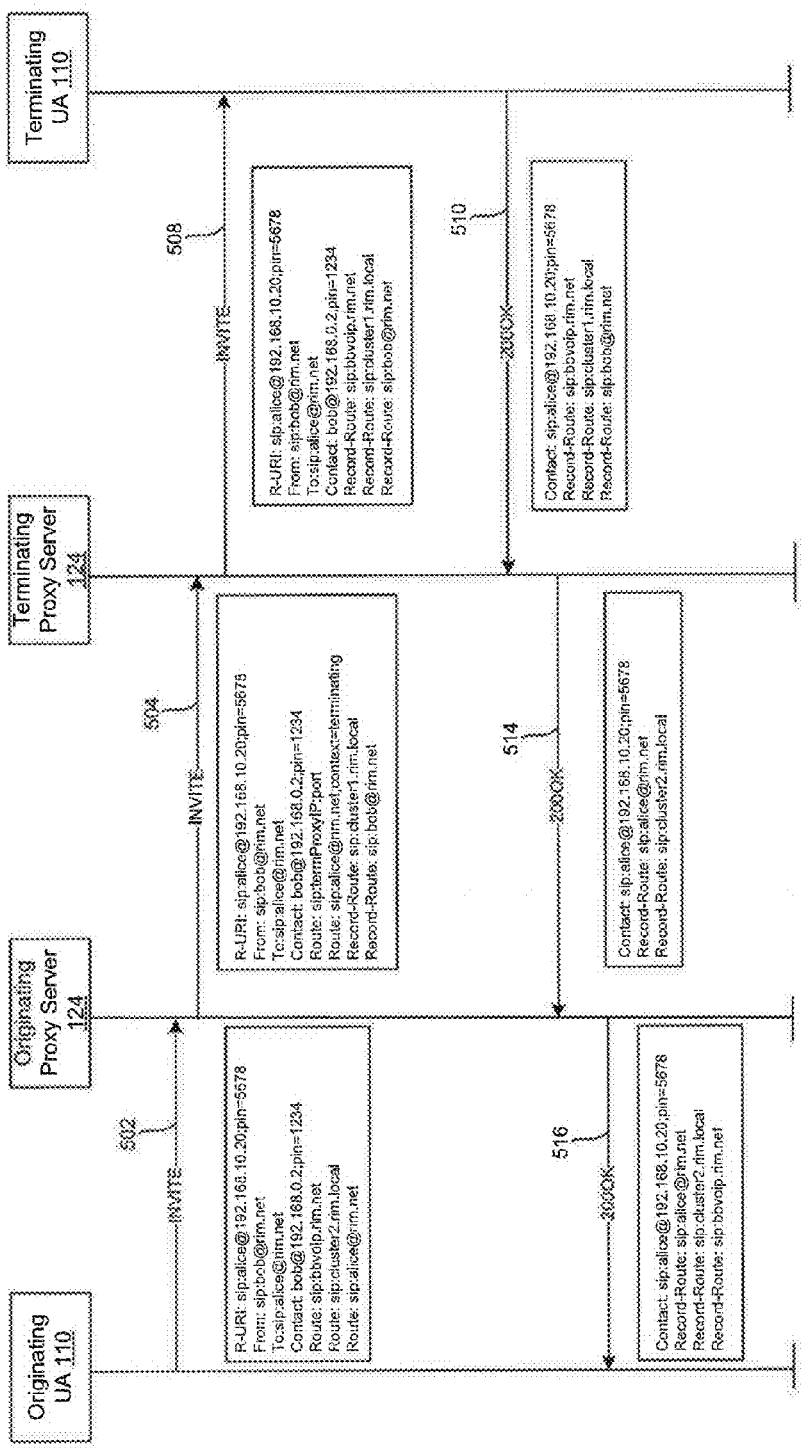
FIG. 5 is a flow diagram of an In-Dialog Transaction Call in a SIP session in which a Record-Routing proxy server is bypassed in accordance with one embodiment of the present disclosure.

FIG. 5 is a flow diagram of an In-Dialog Transaction Call in a SIP session in which a Record-Routing proxy server is bypassed in accordance with one embodiment of the present disclosure. The operations performed by the network components may be more or less than described and may be performed in a different order provided the event flow described below remains the same. When the originating and terminating devices are on the same cluster 120, the Record-Routing proxy server 124 is bypassed.

At event 502, an originating UA 110 sends an INVITE request to an originating proxy server 124. The INVITE request does not contain a Record-Route header but does contain three Route headers. In the shown example, the header of the initial request is as follows:
R-URI: sip:alice@192.168.10.20;pin=5678
From: sip:bob@rim.net
To: sip:alice@rim.net
Contact: bob@192.168.0.2;pin=1234
Route: sip:bbvoip.rim.net
Route: sip:cluster2.rim.local
Route: sip:alice@rim.net The originating proxy server 124 removes the two top-most Route header and sets a first Record-Route header with the cluster FQDN ("sip:cluster1.rim.local" in the shown example) and second Record-Route header with the AOR associated with the connection ("sip:bob@rim.net" in the shown example). The proxy server 124 also adds a first Route header with the address of the terminating proxy server as the top-most Route header with a "context=terminating" parameter so that the message will be sent to terminating proxy server 124.

At event 504, the originating proxy server 124 sends the modified INVITE request to the terminating proxy server 124. The terminating proxy server 124 removes the first and second Route headers. A new third Record-Route header is added as the top-most Record-Route header with a value of an R-URI received from the SIP registrar server which maintains the binding for the AOR ("sip:bbvoip.rim.net"). The new Record-Route header identifies the SIP network 140 and ensures that UAs 110 send subsequent messages over connection used for registration.

At event 508, the terminating proxy server 124 sends the modified INVITE request, with three Record-Route headers, to the terminating UA 110.

At event 510, the terminating UA 110 sends a 200OK message to the terminating proxy server 124 indicating that the INVITE request was successfully processed. The 200OK message includes the same three Record-Route headers that were included in the INVITE request which it received. The terminating proxy server 124 also removes all three Record-Route records and adds new Record-Route headers. The terminating proxy server 124 adds a first Record-Route with the AOR of the terminating UA 110 ("sip:alice@rim.net") and a second Record-Route header with the cluster address (e.g., cluster FQDN) of the terminating proxy server 122 ("sip:cluster2.rim.local").

At event 514, the terminating proxy server 124 sends the modified 200OK message including the two Record-Route headers to the originating proxy server 124. The originating proxy server 124 adds a Record-Route header with the R-URI received at the SIP registrar server 126 which maintains the binding for the AOR ("sip:bbvoip.rim.net"). The new Record- Route header identifies the SIP network 140 and ensures that UAs 110 send subsequent messages over connection used for registration.

At event 516, the originating proxy server 124 sends the modified 200OK message including the three Record-Route headers to the originating UA 110.

Figure 6:
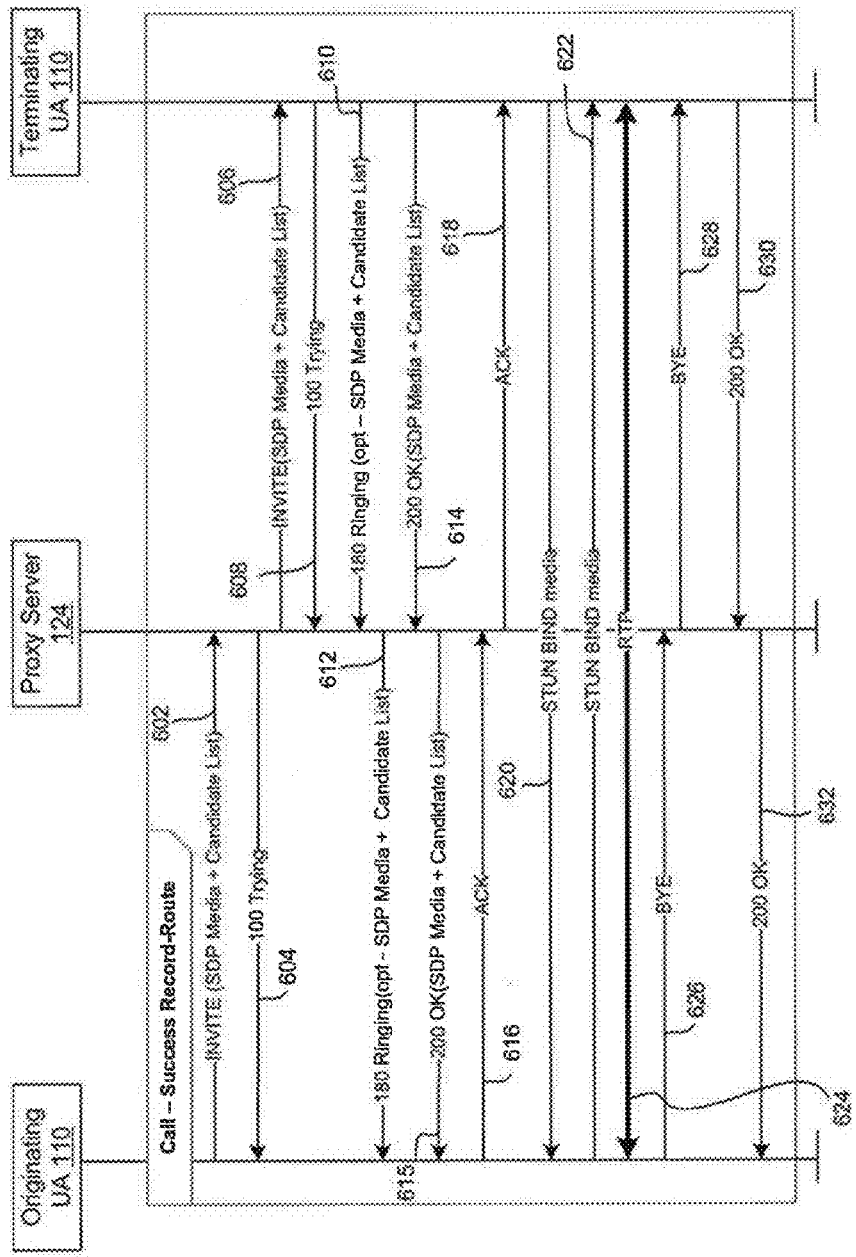
FIG. 6 is a flow diagram of a Record Route Call in a SIP session in accordance with one embodiment of the present disclosure.

FIG. 6 is a flow diagram of a Record Route Call in a SIP session in accordance with one embodiment of the present disclosure. The Record Route Call may contain additional or fewer events than shown and/or described. At event 602, an INVITE message is sent from an originating UA 110 to a proxy server 124. At event 604, a 100 (Trying) message is sent from the proxy server 124 to the originating UA 110. At event 606, an INVITE message is sent from the proxy server 124 to a terminating UA 110. At event 608, a 100 (Trying) message is sent from the terminating UA 110 to the proxy server 124.

At event 610, the terminating UA 110 sends a 180 (Ringing) message to the proxy server 124. At event 612, the proxy server 124 sends a 180 (Ringing) message to the originating UA 110. At event 614, the terminating UA 110 sends a 200 (OK) message to the proxy server 124 indicating that the INVITE request was successfully processed. At event 615, the proxy server 124 sends a 200 (OK) message to the originating UA 110 indicating that the INVITE request was successfully processed.

At event 616, the originating UA 110 sends an ACK message to the proxy server 124. At event 618, the proxy server 124 sends an ACK message to the terminating UA 110. At events 620 and 622, the originating UA 110 and terminating UA 110 repeatedly perform UDP hole punching until success or a maximum number of attempts is reached. At event 624, a RTP (Real-time Transport Protocol) session occurs pursuant to RFC 3550 (assuming successful UDP hole punching).

At event 626, the originating UA 110 sends a BYE message to the proxy server 124. At event 628, the proxy server 124 sends a BYE message to the terminating UA 110. At event 630, the terminating UA 110 sends a 200 (OK) message to the proxy server 124 indicating that the BYE message was successfully processed. At event 632, the proxy server 124 sends a BYE message to the originating UA 110 indicating that the BYE message was successfully processed.

Figure 10:
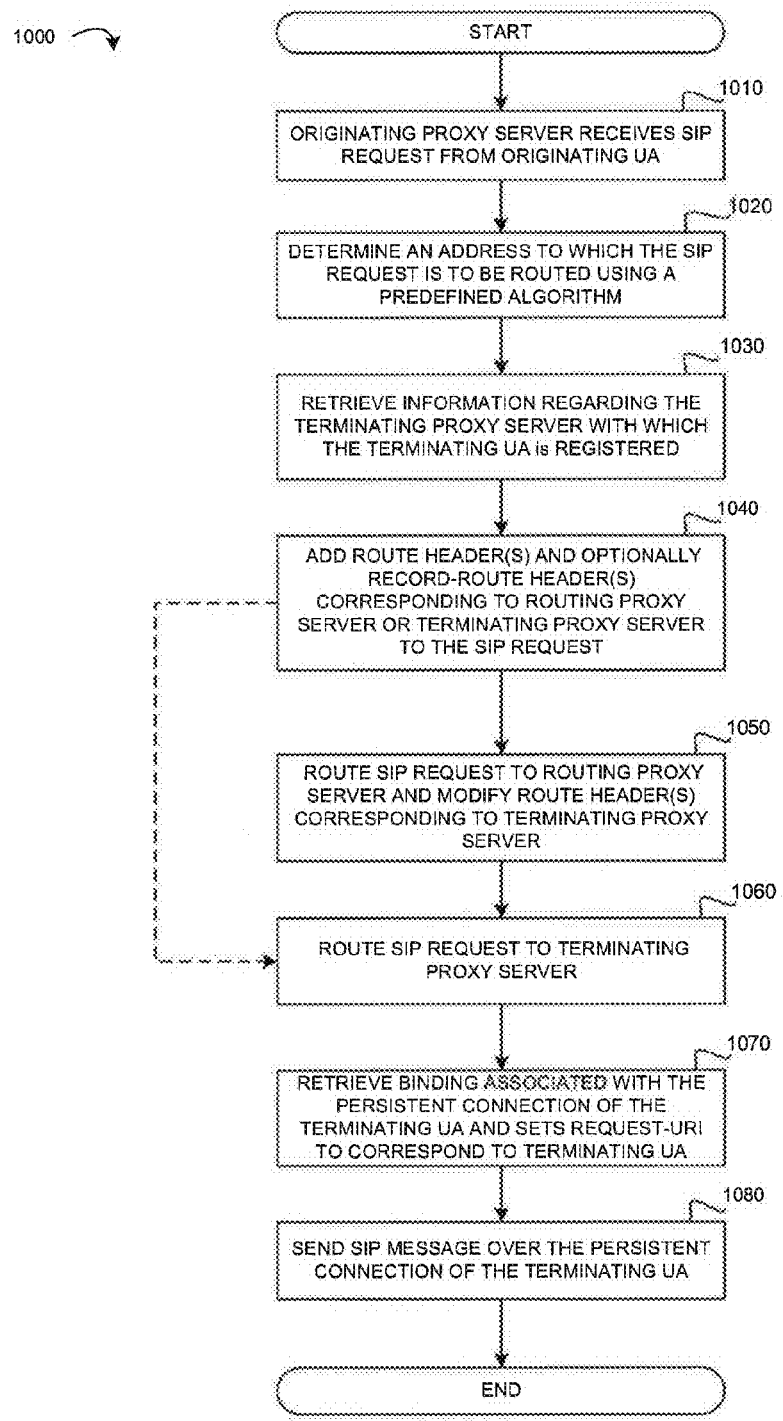
FIG. 10 is a flow diagram of a method for use on SIP proxy servers for routing SIP requests and/or responses to proper endpoints in accordance with one embodiment of the present disclosure.

FIG. 10 is a flow diagram of a method for use on SIP servers for routing SIP requests and/or responses to proper endpoints in accordance with one embodiment of the present disclosure. The method may be carried out in the form of software executed by a processor of one or more network components. Coding of software for carrying out the method is within the scope of a person of ordinary skill in the art provided the present disclosure. The method may contain additional or fewer processes than shown and/or described, and may be performed in a different order. Computer-readable code executable by a processor to perform the method may be stored in a computer-readable medium of the one or more network components.

At 1010, a SIP request is received by an originating proxy server 124 from an originating UA 110. The SIP request specifies a terminating UA 110 to which it is to be sent.

At 1020, the originating proxy server 124 determines an address to which the SIP request is to be routed using a predefined algorithm.

At 1030, the originating proxy server 124 retrieves binding information regarding the terminating proxy server 124 with which the terminating UA 110 is registered. The binding information is stored in the registration repository. A registration binding for the terminating UA 110 is present in the registration repository, which may be distributed cache 180 and/or LDAP 160, when a persistent connection between the terminating UA 110 and terminating proxy server 124 exists. When the persistent connection between the terminating UA 110 and terminating proxy server 124 does not exist, for example, because the persistent connection was terminated, the registration binding for the terminating UA 110 is removed from the registration repository as described above.

At 1040, the originating proxy server 124 adds Route header(s) and optionally Record-Route header(s) corresponding to the particular routing proxy server 124 (if the originating UA 110 and terminating UA 110 are on different clusters 120) or terminating proxy server 112 (if the originating UA 110 and terminating UA 110 are on the same cluster 120) to the SIP request. The Route header(s) and optionally Record-Route header(s) are determined in accordance with a lookup performed using the unique association between the connection ID and binding ID.

At 1050, the originating proxy server 124 optionally route the modified SIP message to a routing proxy server 124 when the originating UA 110 and terminating UA 110 are on different clusters 120. The routing proxy server 124 modifies the Route header(s) to correspond to the particular terminating proxy server 112.

At 1060, the modified SIP message is routed to terminating proxy server 112, either from the routing proxy server 124 or from the originating proxy server 124 when the originating UA 110 and terminating UA 110 are on the same cluster 120.

At 1070, the terminating proxy server 124 retrieves the binding associated with the persistent connection of the terminating UA 110 and sets the request-URI of the SIP message to URI of the terminating UA 110. The terminating proxy server 124 also sends the SIP message over the persistent connection of the terminating UA 110.

At 1080, the terminating proxy server 124 also sends the SIP message over the persistent connection of the terminating UA 110.

It will be appreciated that, if the persistent connection between the terminating UA 110 and terminating proxy server 124 does not exist, the binding for the terminating UA 110 cannot be retrieved and the originating proxy server 124 will reject the SIP request. The above-described method uses the unique association between the connection ID and binding ID, described above, for retrieval of binding, connection and terminating proxy server 124 at which the persistent connection is hosted.

In accordance with one embodiment, there is provided a method for performing a transaction call between an originating device and a terminating device, comprising: receiving, by a originating proxy server in a first cluster, a SIP message from the originating device over a first connection; and sending, by the originating proxy server, the SIP message to a routing proxy server in a second server cluster.

In accordance with another embodiment, there is provided a method for a routing proxy server for performing a transaction call between an originating device and a terminating device, comprising: receiving, by the routing proxy server in a second cluster, a SIP message from an originating proxy server in a first duster; sending, by the routing proxy server, the SIP message to a terminating proxy server in the second server cluster.

In accordance with a further embodiment, there is provided a method for a terminating proxy server for performing a transaction call between an originating device and a terminating device, comprising: receiving, by the terminating proxy server in a second cluster, a SIP message from a routing proxy server in the second duster; sending, by the terminating proxy server, the SIP message to the terminating device.

In accordance with yet a further embodiment, there is provided a network component, comprising: a processor configured to perform the method(s) set forth herein. In some examples, the network component may be a SIP server.

In accordance with yet a further embodiment of the present disclosure, there is provided a machine readable medium having stored thereon machine executable instructions for implementing a method on a computing device such as a network component, the machine executable instructions comprising instructions for performing the method(s) set forth herein.

Authentication and Security

In accordance with another aspect of the present disclosure, there is provided a system and method for applying authentication and security policies in a SIP network 140, in particular a system and method for applying authentication and security policies in a clustered environment such as a SIP registrar/proxy server farm. Endpoints, such as UAs, in the clustered environment use persistent connections which are distributed between nodes in the SIP registrar/proxy server farm using, for example, load balancing or DNS round robin. This allows every endpoint to be reached using a persistent connection from a particular node 122. All nodes 122 use shared persistent storage (e.g., distributed cache) to store endpoint location information (i.e., bindings). In such clustered environments where persistent connections are used between endpoints and servers, there is a need to be able to locate the node 122 at which an endpoint maintains its persistent connection so that subsequent requests in same dialog can be routed correctly over existing persistent connection.

The present disclosure provides a unique association between the binding and the persistent connection for endpoints. The unique association between binding and connection allows optimization of security policies and enhancing call routing based on authenticated connections.

In one aspect, UAs are enforced to re-use existing persistent connections. Newly created persistent connections are authenticated. Requests sent over existing persistent connections may be authenticated to a lesser extent or not at all. This decreases resource consumption for authentication and may reduce and/or eliminate request, challenge, and/or response handshakes for existing persistent connections where such connections have been previously authenticated.

In another aspect, an SIP registrar server 126 applies an idle connection timeout policy to prevent resource denial attacks. When a new persistent connection is established, but no valid authenticated registration is received during a threshold amount of time, the new persistent connection is considered to be idle and is dropped.

In a further aspect, the bindings of dropped persistent connections are removed by the SIP registrar server 126 thereby preventing routing to stale bindings.

Figure 8:
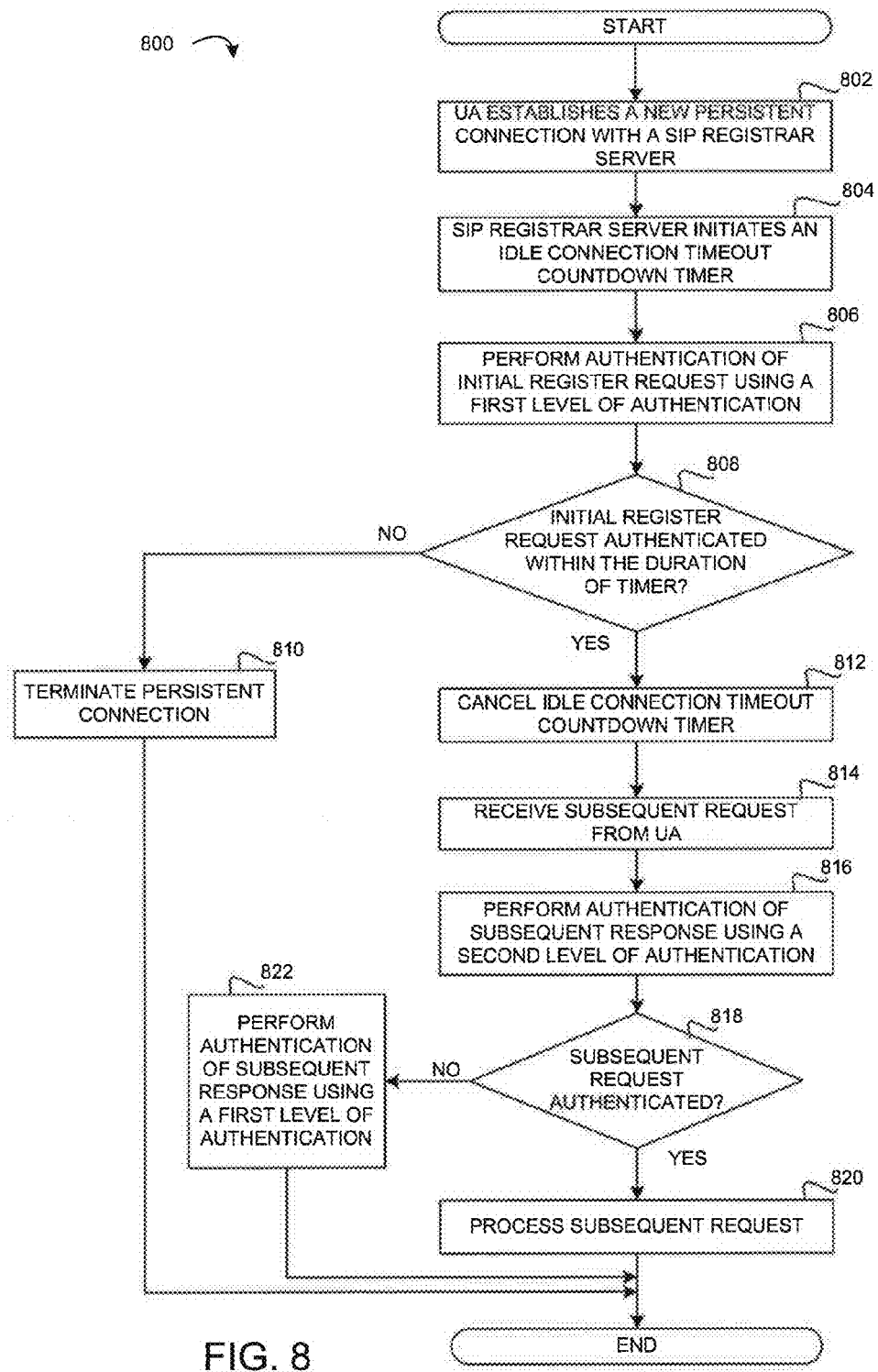
FIG. 8 is a flow diagram of a method for use on a SIP server for authenticating a request in accordance with one embodiment of the present disclosure.

Reference is now made to FIG. 8 which illustrates a flow diagram of a method 800 for use on a node 122, for example by a SIP registrar server 126, for authenticating requests in accordance with one embodiment of the present disclosure. The method may be carried out in the form of software executed by a processor of one or more network components. Coding of software for carrying out the method is within the scope of a person of ordinary skill in the art provided the present disclosure. The method may contain additional or fewer processes than shown and/or described, and may be performed in a different order. Computer-readable code executable by a processor to perform the method may be stored in a computer-readable medium of the one or more network components.

At 802, a UA 110 establishes a new persistent connection with a SIP registrar server 126 in a cluster 120. At 804, the SIP registrar server 126 initiates an idle connection timeout countdown timer in accordance with an idle connection timeout policy of the SIP registrar server 126. The idle connection timeout countdown timer defines an idle connection timeout interval (or duration) for receiving a valid authenticated initial REGISTER request from the UA 110. The idle connection timeout countdown timer counts down from an initial value. The initial REGISTER message may be sent, for example, in order to initiate a new SIP session.

At 806, an initial registration request is received over the persistent connection and authentication of the initial registration request (i.e., the initial REGISTER message) is performed using a first level of authentication. The authentication of requests may take one of several forms which are outside of the scope of the present disclosure. Methods of authenticating a request may include a token or key, generated by the UA 110 with an algorithm known to both the UA 110 and SIP registrar server 126, which can be validated by the SIP registrar server 126 as a form of authentication. When the REGISTER request includes a token or key which is validated by the SIP registrar server 126, the REGISTER request is validated. When the REGISTER request does not include a token or key, or includes a token or key which is not validated by the SIP registrar server 126, the REGISTER request not validated.

At 808, it is determined whether the initial REGISTER message is authenticated before expiry of the idle connection timeout countdown timer.

At 810, when the initial REGISTER request is not validated before expiry of the idle connection timeout countdown timer (i.e., not within the duration of the idle connection timeout countdown timer), the persistent connection is not validated and the connection is considered to be idle and is terminated (e.g., dropped) by the SIP registrar server 126.

At 812, when the initial REGISTER request is validated before expiry of the idle connection timeout countdown timer, the persistent connection is validated and the idle connection timeout countdown timer is cancelled.

At 814, a subsequent request from the UA 110 is received over the existing persistent connection. The subsequent request may be any type of request, such as an INVITE request or other suitable type of request.

At 816, authentication of the subsequent request on the existing persistent connection is performed using a second level of authentication. The second level of authentication may be lower than the first level of authentication used to authenticate the initial registration request. The second level of authentication may comprise minor validation, such as validating the user name, and/or parameters in the subsequent request, or possibly no authentication. The first level of authentication and second level of authentication may be separately or jointly configurable. The first level of authentication and second level of authentication may be set in accordance IT policy.

At 818, it is determined whether the subsequent request is authenticated. At 820, when the subsequent request is authenticated, the subsequent request is processed. At 822, when the subsequent request is not authenticated, authentication of the subsequent request on the existing persistent connection is performed using the first level of authentication. When the subsequent request is authenticated at the first level of authentication, the subsequent request is processed. When the subsequent request is not authenticated, the subsequent request is rejected.

Figure 9:
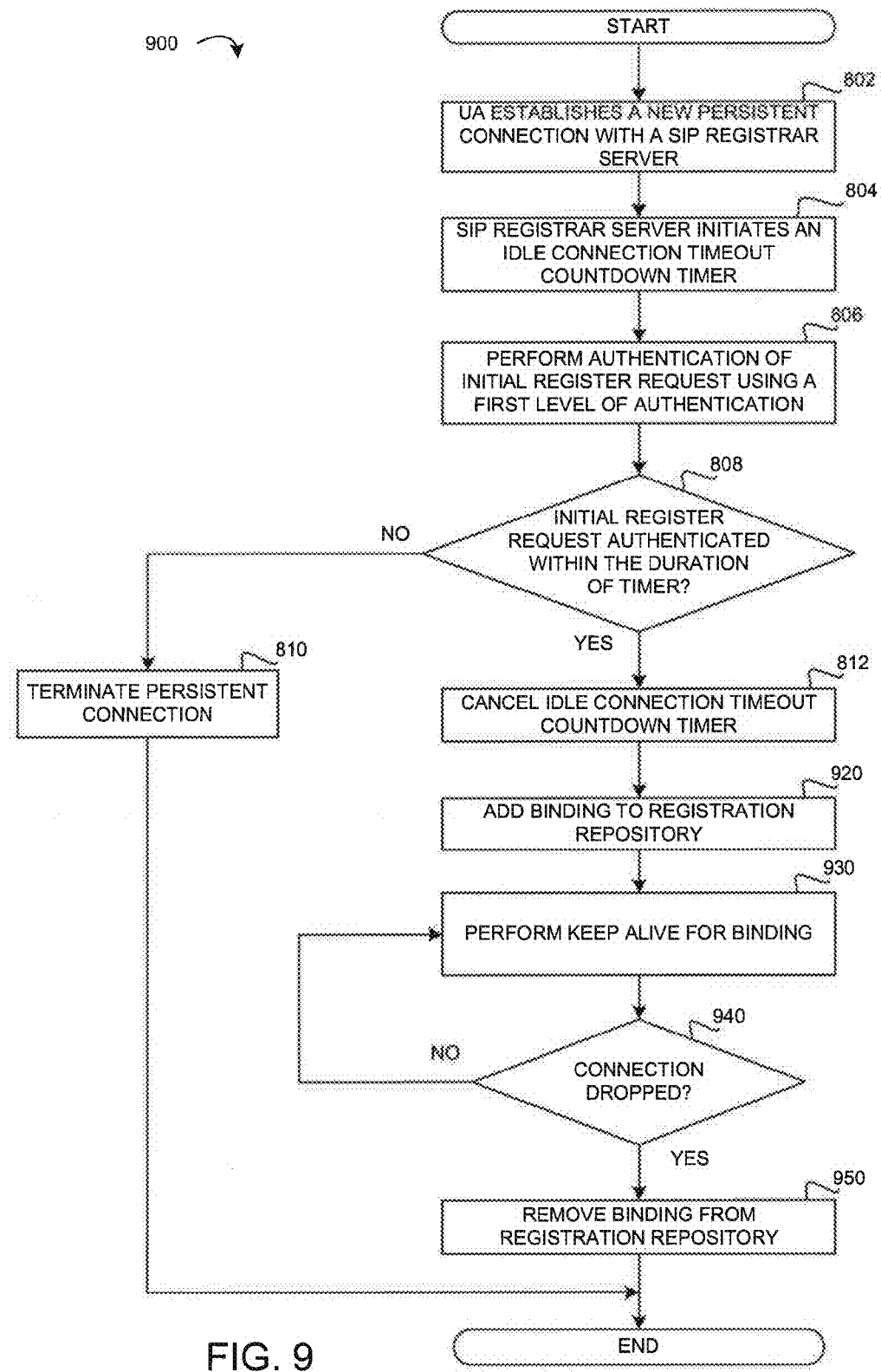
FIG. 9 is a flow diagram of a method for use on a SIP registrar server for managing a binding in accordance with one embodiment of the present disclosure.

Reference is now made to FIG. 9 which illustrates a flow diagram of a method 900 for use on a SIP registrar server 126 for managing a binding in accordance with one embodiment of the present disclosure. The method may be carried out in the form of software executed by a processor of one or more network components. Coding of software for carrying out the method is within the scope of a person of ordinary skill in the art provided the present disclosure. The method may contain additional or fewer processes than shown and/or described, and may be performed in a different order. Computer-readable code executable by a processor to perform the method may be stored in a computer-readable medium of the one or more network components.

At 802, a UA 110 establishes a new persistent connection with a SIP registrar server 126 in a cluster 120. At 804, the SIP registrar server 126 initiates an idle connection timeout countdown timer in accordance with an idle connection timeout policy of the SIP registrar server 126.

At 806, authentication of the initial registration request (i.e., the initial REGISTER message) on the new persistent connection is performed using a first level of authentication.

At 808, it is determined whether the initial REGISTER message is authenticated before expiry of the idle connection timeout countdown timer.

At 810, when the initial REGISTER request is not validated before expiry of the idle connection timeout countdown timer, the persistent connection is not validated and the connection is considered to be idle and is terminated (e.g., dropped) by the SIP registrar server 126.

At 812, when the initial REGISTER request is validated before expiry of the idle connection timeout countdown timer, the persistent connection is validated and the idle connection timeout countdown timer is cancelled.

At 920, a new binding is created and stored by the SIP registrar server 126 in the registration repository, such as the distributed cache 180, in association with a binding ID and connection ID, as described above. A mapping of the binding ID and connection ID is also stored in the internal storage of the SIP registrar server 126.

At 930, the SIP registrar server 126 initiates a keep alive procedure for the persistent connection. Keep alive procedures may include sending keep alive packets to the UA 110 over the persistent connection. When a keep-alive ACK response is not received within a threshold duration, the connection is considered to be idle and is terminated (e.g., dropped) by the SIP registrar server 126.

At 940, it is determined whether the persistent connection is dropped. At 950, when the persistent connection is dropped, the associated binding is removed. This prevents routing requests to the stale binding. Otherwise, the SIP registrar server 126 continues to determine whether the persistent connection has been dropped.

In alternative embodiments, the idle connection timeout countdown timer used in the methods 800 and 900 may define an idle connection timeout interval for receiving an initial REGISTER request from the UA 110 and authentication is performed after the idle connection timeout countdown timer is cancelled. This should result in a shorter idle connection timeout countdown timer because authentication is performed after the idle connection timeout countdown timer ends.

While the methods 800 and 900 have been described as separate methods, processes from the methods 800 and 900 may be performed together, for example, as part of a combined method, or processes from the methods 800 and 900 may be performed concurrently described as separate methods.

In accordance with one embodiment, there is provided a method for use on a SIP server, comprising: establishing a persistent connection with a user agent (UA); initiating an idle connection timeout countdown timer; performing authentication of an initial REGISTER request using a first level of authentication; and terminating the persistent connection when the initial REGISTER request is not validated before expiry of the idle connection timeout countdown timer.

In accordance with another embodiment, there is provided a method for use on a SIP server, comprising: establishing a persistent connection with a user agent (UA); performing authentication of an initial REGISTER request using a first level of authentication; receiving a subsequent request from the UA over the persistent connection; and performing authentication of the subsequent request using a second level of authentication, wherein the second level of authentication is lower than the first level of authentication.

In accordance with a further embodiment, there is provided a method for use on a SIP server, comprising: establishing a persistent connection with a user agent (UA); initiating an idle connection timeout countdown timer; and terminating the persistent connection when an initial REGISTER request is not validated before expiry of the idle connection timeout countdown timer.

In accordance with yet a further embodiment, there is provided a network component, comprising: a processor configured to perform the method(s) set forth herein. In some examples, the network component may be a SIP server.

In accordance with yet a further embodiment of the present disclosure, there is provided a machine readable medium having stored thereon machine executable instructions for implementing a method on a computing device such as a network component, the machine executable instructions comprising instructions for performing the method(s) set forth herein.

Binding Identification

A UA 110 may fail to gracefully terminate its binding in some instances, for example, as a result of an abrupt power-off of the UA 110 or loss of network connectivity. Conventionally, when a UA 110 fails to gracefully terminate its binding (e.g., by issuing a REGISTER request with an "Expires" parameter having a value of 0) and issues a new REGISTER message when the IP address of the UA 110 has been changed, a new binding will be created in addition to previous binding. The extraneous binding wastes resources required to maintain the old (unneeded) binding, including the storage and timer required to monitor binding expiration. More importantly, all requests sent to the UA 110 will be routed in accordance with both the new (active) binding and the previous (stale) binding which consumes computing resources, generates network traffic and may delay generating final responses to an originating UA 110. A delay in generating final responses to an originating UA 110 may be caused by a delay in detecting unavailability of a UA 110 for the stale binding by the routing server, such as a SIP routing server. Additionally, stale bindings may pose a security risk in that stale bindings may be used by third parties for resource denial attacks. Furthermore, registration information exposed using event package for registration pursuant to RFC 3680 will be inadequate.

In accordance with a further aspect of the present disclosure, there is provided a system and method for user agent identification and efficient binding which reduces the likelihood that stale bindings may occur. A binding key is used for UA identification during binding to prevent duplicate bindings from being formed. As mentioned previously, the binding key may be a configurable list of elements. The binding key is a combination of values of these elements. The binding key, in one embodiment, specifies a Contact URI and specified identifying information for a particular UA device. Bindings are treated as equivalent if all elements of binding key are the same. Other URI parts are ignored for the purpose of URI comparison.

While RFC 5626 provides a solution for managing client-initiated connections in SIP using an Instance Identifier (ID), such as a Universally Unique Identifier (UUID) which uniquely identifies the device, the solution provided by the present disclosure relies on pre-existing identifying information, provides a simpler and more flexible solution, and which can unambiguously distinguish bindings and maintain a single binding per device. This method can be applied to any transport protocol, including User Datagram Protocol (UDP), Transmission Control Protocol (TCP), Transport Layer Security (TLS) and Stream Control Transmission Protocol (SCTP). Furthermore, as noted above, the binding key may be a configurable list of elements. Providing a configurable list of elements allows a system administrator to define a binding key based on the particular system architecture and configuration, providing a more flexible and robust solution.

Figure 11:
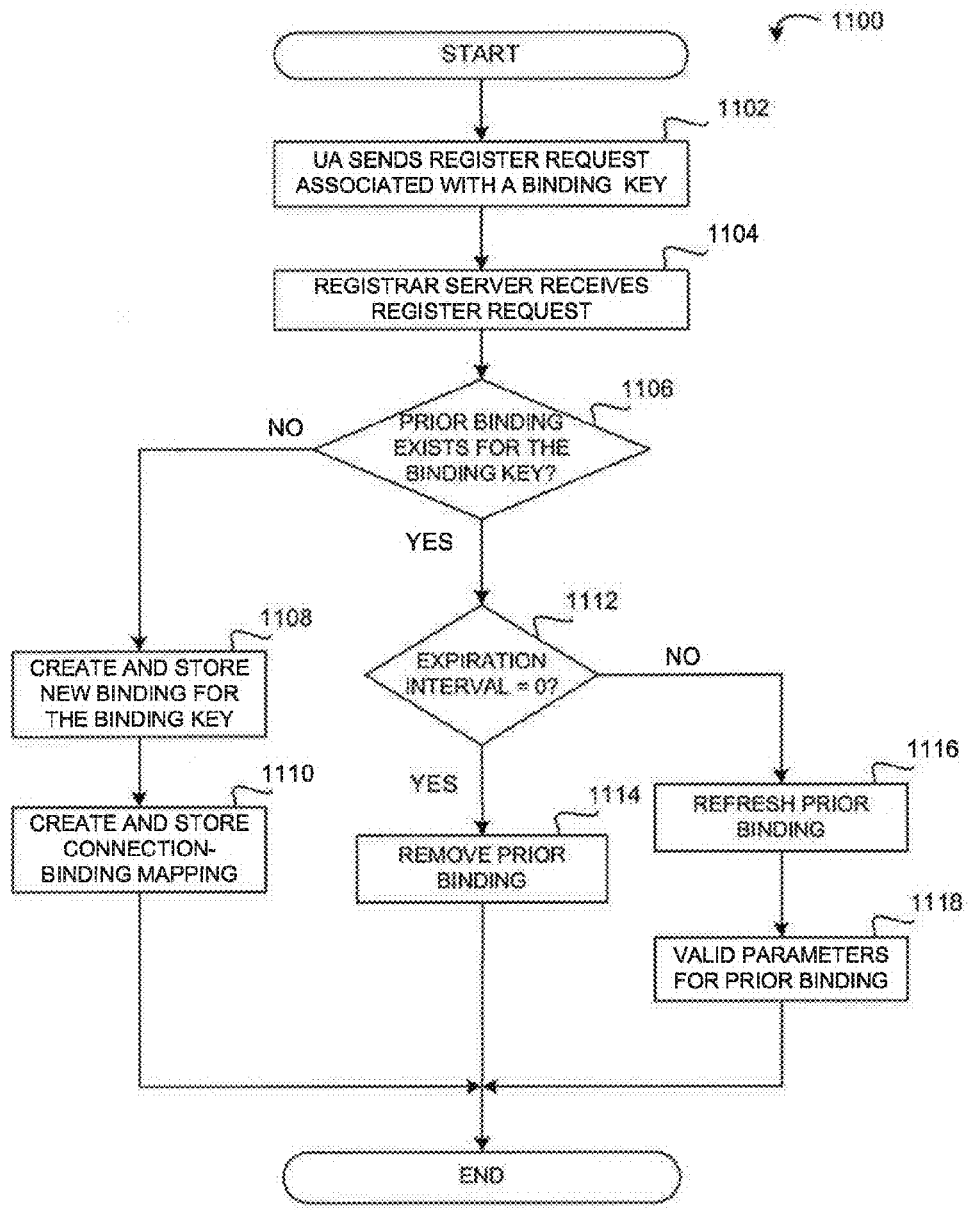
FIG. 11 is a flow diagram of a method for use on a SIP registrar server for registering user agents in accordance with one embodiment of the present disclosure.

Reference is now made to FIG. 11 which illustrates a flow diagram of a method 1100 for use on a SIP registrar server 126 for registering UAs 110 in accordance with one embodiment of the present disclosure. The method may be carried out in the form of software executed by a processor of one or more network components. Coding of software for carrying out the method is within the scope of a person of ordinary skill in the art provided the present disclosure. The method may contain additional or fewer processes than shown and/or described, and may be performed in a different order. Computer-readable code executable by a processor to perform the method may be stored in a computer-readable medium of the one or more network components.

A UA 110 sends a REGISTER message to a SIP registrar server 126 or SIP proxy server 124 in the cluster 120 (1102). The REGISTER message may be sent, for example, in order to initiate or renew a SIP session. The SIP registrar server 126 then receives the REGISTER message (1104). When the REGISTER message is sent to the SIP proxy server 124 and the SIP registrar server 126 is a separate physical entity from the SIP proxy server 124, the SIP proxy server 124 routes the REGISTER message to the SIP registrar server 126 in the domain of the SIP service provider of the UA 110.

The REGISTER message includes the binding key in a Contact header field of the REGISTER message. As described above, the binding key may comprise the Contact URI and identifying information for a device associated with a UA to be registered. The identifying information may be a unique identifier. For example, the identifying information may be a PIN, device serial number or MAC address. In one embodiment, the identifying information is a PIN and user name.

The SIP registrar server 126 determines whether a prior binding associated with the binding key exists in a registration repository, such as the distributed cache 180 (1106). Binding key matching is applied in this determining rather than URI comparison as prescribed by RFC 3261. When no prior binding associated with the binding key exists in the registration repository, a new binding associated with the binding key is created and the new binding is stored in the registration repository (1108). In some embodiments, the new binding includes Call-ID and/or CSeq parameters defined by RFC 3261, and possibly other parameters.

When the UA 110 to be registered connects to the communication system 100 using a connection-orientated protocol, such as TCP, a connection-binding mapping is created and stored in the registration repository (1110). When the UA 110 to be registered connects to the communication system 100 using a connectionless protocol, such as UDP, no connection-binding mapping exists.

When a prior binding associated with the binding key exists in the registration repository, the SIP registrar server 126 determines whether the REGISTER message specifies an expiration interval of 0 (1112). As noted above, the expiration interval for a binding may be specified through an Expires header field or an "expires" Contact header parameter. When the REGISTER message specifies an expiration interval of 0, the prior binding is removed from the registration repository (1114). When the REGISTER message does not specify an expiration interval of 0, i.e., when the REGISTER message does not include an expiration interval or includes an expiration interval greater than 0, the prior binding is refreshed in the registration repository (1116). Optionally, one or more parameters for the prior binding in the registration repository may be validated (1118). The parameters which are validated may include, for example, VoIP parameters such as Call-ID and/or CSeq parameters.

In accordance with one example embodiment, there is provided a method for use on a Session Initiation Protocol (SIP) registrar server for registering user agents, comprising: receiving a REGISTER message which includes a binding key; determining whether a prior binding associated with the binding key exists in a registration repository; and creating a new binding associated with the binding key and adding the new binding to the registration repository when no prior binding associated with the binding key exists in the registration repository.

In accordance with another example embodiment, there is provided a network component, comprising: a processor configured to perform the method(s) set forth herein.

In accordance with a further example embodiment, there is provided a network component, comprising: a processor configured to receive a REGISTER message which includes a binding key, determine whether a prior binding associated with the binding key exists in a registration repository, and create a new binding associated with the binding key and adding the new binding to the registration repository when no prior binding associated with the binding key exists in the registration repository.

In accordance with yet a further example embodiment, there is provided a method for use on a user agent for registering with a Session Initiation Protocol (SIP) registrar server, comprising: sending a REGISTER message sent to the SIP registrar server, wherein the REGISTER message includes a binding key.

In accordance with yet a further example embodiment, there is an electronic in the form a user agent comprising: a processor configured to cause a REGISTER message to be sent to a SIP registrar server, wherein the REGISTER message includes a binding key.

In accordance with yet a further embodiment of the present disclosure, there is provided a machine readable medium having stored thereon machine executable instructions for implementing a method on a computing device, the machine executable instructions comprising instructions for performing the method(s) set forth herein.

Binding Maintenance

In accordance with yet a further aspect of the present disclosure, there is provided a system and method for shared binding maintenance. The method and system may be employed in, for example, a SIP registrar/proxy server farm. Endpoints such as UAs 110 use persistent connections which are distributed between nodes 122 in the SIP registrar/proxy server farm using, for example, load balancing or DNS. This allows endpoints to be reached using a persistent connection from a particular node 122. The nodes 122 of the SIP registrar/proxy server farm use shared persistent storage to store endpoint location information (i.e., bindings). In the event of a node failure, endpoints can reconnect to available nodes. All bindings maintained by failed node(s) remain stored in the persistent storage despite connection termination. The present disclosure presents mechanisms for removing invalid location information (i.e., stale bindings) in such circumstances.

Figure 12:
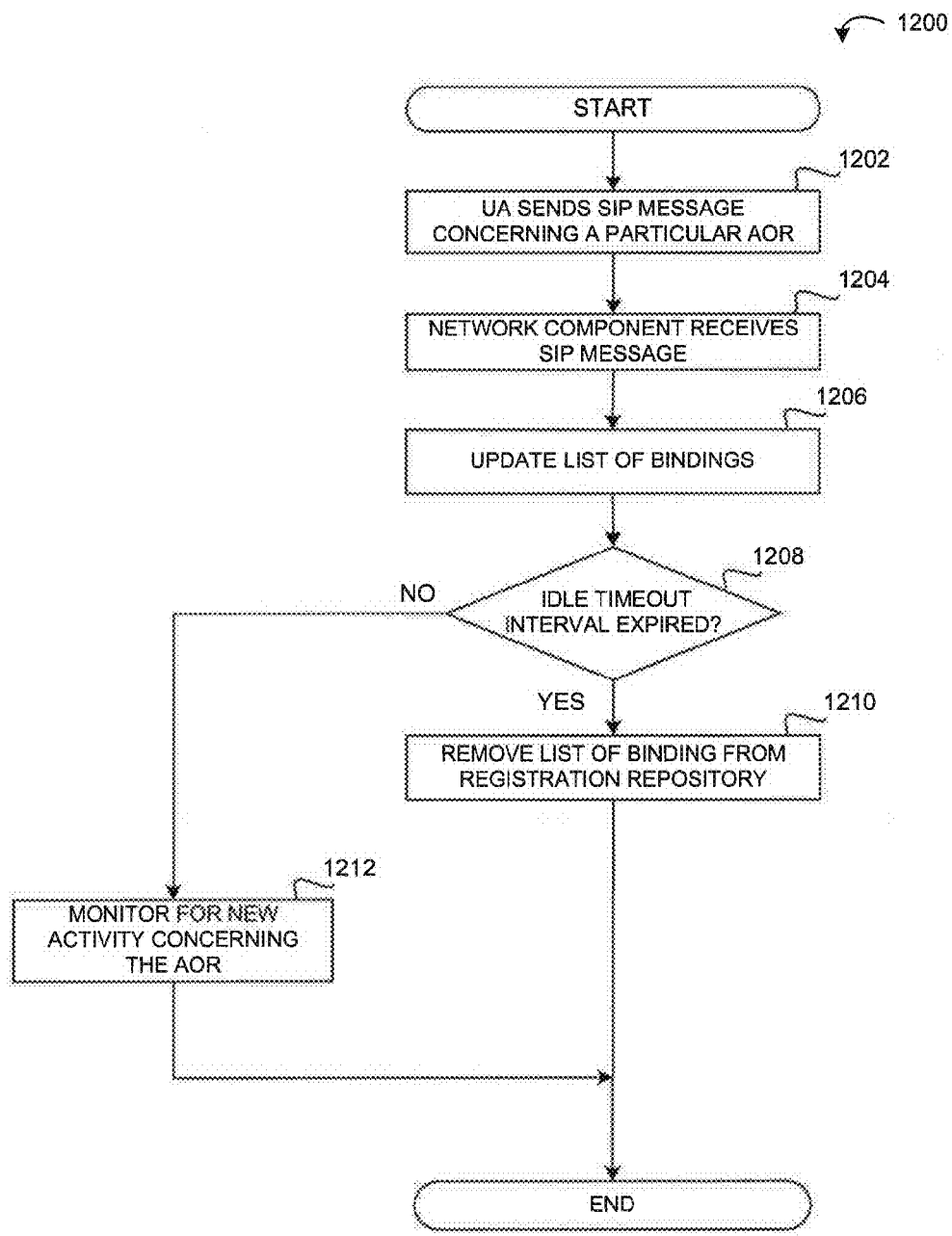
FIG. 12 is a flow diagram of a method for use on a SIP registrar server for updating bindings in accordance with one embodiment of the present disclosure.

Reference is now made to FIG. 12 which illustrates a flow diagram of a method 1200 for use on a network component for updating a list of one or more bindings for UAs 110 in accordance with one embodiment of the present disclosure. The method may be carried out in the form of software executed by a processor of one or more network components. Coding of software for carrying out the method is within the scope of a person of ordinary skill in the art provided the present disclosure. The method may contain additional or fewer processes than shown and/or described, and may be performed in a different order. Computer-readable code executable by a processor to perform the method may be stored in a computer-readable medium of the one or more network components.

A UA 110 sends an SIP message concerning a particular AOR to a network component, such as the SIP proxy server 124 or SIP registration server 140 (1202). The SIP message may be any SIP message sent from the AOR. The SIP message is received by the SIP proxy server 124 or SIP registration server 140 (1204). The receipt of the SIP message from the AOR is activity associated with the AOR.

The SIP registration server 140 then receives the REGISTER message (1204). When the REGISTER message is sent to the SIP proxy server 124 and the SIP registrar server 140 is a separate physically entity from the SIP proxy server 124, the SIP proxy server 124 routes the REGISTER message to the SIP registrar server 140 in the domain of the SIP service provider of the UA 110.

The SIP registrar server 140 then updates a list of one or more bindings for the AOR in a registration repository, such as the distributed cache 180 (1206). The updating comprises updating a value of the idle timeout parameter in the registration repository for the list of one or more bindings for the AOR. As described above, the idle timeout parameter defines an idle timeout interval. The idle timeout interval specifies a time interval in which the list of bindings stored in the registration repository is permitted to remain inactive. The idle timeout parameter may be a timestamp specifying a time at which the idle timeout interval expires. The updating sets the value of the idle timeout parameter to a maximum value of the expiration timeout parameter. As described above, the expiration timeout parameter defines an expiration interval that specifies a time interval for which the list of bindings is valid.

The updating may further comprise updating a logical location of the AOR in the registration repository.

The network component, e.g., SIP proxy server 124 or SIP registration server 140, monitors the idle timeout parameter and determines whether the idle timeout interval associated with the list of bindings has expired (1208). When the idle timeout interval associated with the list of bindings has expired, the AOR is removed from the registration repository (1210).

When the idle timeout interval associated with the binding has not expired, network component does not change the binding in the registration repository. The network component monitors for new activity concerning the AOR may yet update the idle timeout interval (1212).

The foregoing method provides a solution for shared binding maintenance in which active bindings are stored in the registration repository. This avoids stale bindings from being present in the registration repository.

In accordance with one example embodiment, there is provided a method for use on a network component for updating bindings, comprising: receiving a Session Initiation Protocol (SIP) message concerning a particular Address-of-Record (AOR); and updating a list of one or more bindings for the particular AOR in a registration repository.

In accordance with another example embodiment, there is provided a network component, comprising: a processor configured to receive a Session Initiation Protocol (SIP) message concerning a particular Address-of-Record (AOR), and update a list one or more bindings for the particular AOR in a registration repository.

In accordance with yet a further embodiment of the present disclosure, there is provided a machine readable medium having stored thereon machine executable instructions for implementing a method on a computing device, the machine executable instructions comprising instructions for performing the method(s) set forth herein.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar machine readable medium including program instructions stored thereon for performing the methods described herein.

The present disclosure may be embodied in other specific forms without departing from its spirit or essential characteristics. The described example embodiments are to be considered in all respects as being only illustrative and not restrictive. The present disclosure intends to cover and embrace all suitable changes in technology. The scope of the present disclosure is, therefore, described by the appended claims rather than by the foregoing description.

The invention claimed is:

1. A SIP (Session Initiation Protocol) server comprising a processor connected to a memory, the processor configured to:
   establish a persistent connection between a user agent (UA) and the SIP server;
   initiate an idle connection timeout countdown timer subsequent to establishing the persistent connection;
   initiate authentication of an initial REGISTER request using a first level of authentication subsequent to initiating the idle connection timeout countdown timer;
   terminate the persistent connection when the initial REGISTER request is not authenticated before expiry of the idle connection timeout countdown timer; and
   store a new binding for the UA in a registration repository when the initial REGISTER request is authenticated and remove the new binding when the persistent connection is dropped.

2. The SIP server of claim 1, wherein the processor is further configured to:
  receive a subsequent request from the UA over the persistent connection; and
  perform authentication of the subsequent request using a second level of authentication, wherein the second level of authentication is lower than the first level of authentication.

3. The SIP server of claim 2, wherein the second level of authentication comprises minor validation.

4. The SIP server of claim 3, wherein the minor validation comprises validating at least one of the user name, password, and parameters in the subsequent request.

5. The SIP server of claim 2, wherein the second level of authentication comprises no authentication.

6. The SIP server of claim 2 wherein the processor is further configured to:
  process the subsequent request when the subsequent request is authenticated.

7. The SIP server of claim 6 wherein the processor is further configured to:
  reject the subsequent request when the subsequent request is not authenticated.

8. A SIP (Session Initiation Protocol) server comprising a processor connected to a memory, the processor configured to:
  establish a persistent connection between a user agent (UA) and the SIP server;
  initiate an idle connection timeout countdown timer subsequent to establishing the persistent connection;
  initiate authentication of an initial REGISTER request using a first level of authentication subsequent to initiating the idle connection timeout countdown timer;
  terminate the persistent connection when an initial REGISTER request is not authenticated before expiry of the idle connection timeout countdown timer;
  store a new binding for the UA in a registration repository when the initial REGISTER request is authenticated; and
  initiate a keep alive procedure for the persistent connection.

9. The SIP server of claim 8, wherein the processor is further configured to:
  receive a subsequent request from the UA over the persistent connection; and
  perform authentication of the subsequent request using a second level of authentication, wherein the second level of authentication is lower than the first level of authentication.

10. The SIP server of claim 9, wherein the second level of authentication comprises minor validation.

11. The SIP server of claim 10, wherein the minor validation comprises validating at least one of the user name, password, and parameters in the subsequent request.

12. The SIP server of claim 9, wherein the second level of authentication comprises no authentication.

13. The SIP server of claim 9 wherein the processor is further configured to:
  process the subsequent request when the subsequent request is authenticated.

14. The SIP server of claim 13 wherein the processor is further configured to:
  reject the subsequent request when the subsequent request is not authenticated.

15. The SIP server of claim 8 wherein the processor is further configured to:
  remove the new binding when the persistent connection is dropped.

16. A non-transitory computer-readable medium storing program instructions that when executed by a processor cause the processor to perform a method for authenticating requests by a SIP (Session Initiation Protocol) server, the method comprising:
  establishing a persistent connection between a user agent (UA) and the SIP server;
  initiating an idle connection timeout countdown timer subsequent to establishing the persistent connection;
  initiating authentication of an initial REGISTER request using a first level of authentication subsequent to initiating the idle connection timeout countdown timer;
  terminating the persistent connection when an initial REGISTER request is not authenticated before expiry of the idle connection timeout countdown timer; and
  storing a new binding for the UA in a registration repository when the initial REGISTER request is authenticated and removing the new binding when the persistent connection is dropped.

17. A non-transitory computer-readable medium storing program instructions that when executed by a processor cause the processor to perform a method for authenticating requests by a SIP (Session Initiation Protocol) server, the method comprising:
  establishing a persistent connection between a user agent (UA) and the SIP server;
  initiating an idle connection timeout countdown timer subsequent to establishing the persistent connection;
  initiating authentication of an initial REGISTER request using a first level of authentication subsequent to initiating the idle connection timeout countdown timer;
  terminating the persistent connection when an initial REGISTER request is not authenticated before expiry of the idle connection timeout countdown timer;
  storing a new binding for the UA in a registration repository when the initial REGISTER request is authenticated; and
  initiating a keep alive procedure for the persistent connection.

* * * * *